(12) United States Patent
Davis

(10) Patent No.: US 11,427,164 B2
(45) Date of Patent: Aug. 30, 2022

(54) TRUCK TRACKOUT CLEANING SYSTEM

(71) Applicant: Michael J Davis, Ramsey, MN (US)

(72) Inventor: Michael J Davis, Ramsey, MN (US)

( * ) Notice: Subject to any disclaimer, the term of this patent is extended or adjusted under 35 U.S.C. 154(b) by 159 days.

(21) Appl. No.: 16/383,121

(22) Filed: Apr. 12, 2019

(65) Prior Publication Data

US 2019/0344759 A1 Nov. 14, 2019

Related U.S. Application Data

(60) Provisional application No. 62/657,547, filed on Apr. 13, 2018.

(51) Int. Cl.
*B60S 3/04* (2006.01)

(52) U.S. Cl.
CPC .................................... *B60S 3/042* (2013.01)

(58) Field of Classification Search
CPC .......... B60B 39/00; B60B 39/12; E01B 23/00
See application file for complete search history.

(56) References Cited

U.S. PATENT DOCUMENTS

| 4,265,399 | A | * | 5/1981 | Covington | .............. | B60B 39/12 238/14 |
| 5,261,433 | A | * | 11/1993 | Smith | ..................... | B60S 3/042 134/123 |
| 6,881,006 | B1 | | 4/2005 | Lange | | |
| 6,981,818 | B1 | | 1/2006 | Lange | | |
| 7,059,799 | B1 | | 6/2006 | Lange | | |
| 7,775,739 | B1 | | 8/2010 | Lange | | |

OTHER PUBLICATIONS

Photos of Rock Systems, Admitted Prior Art, One Page.
Photos of Trackout Pads and Mats, Admitted Prior Art, One Page.
Photos of Wheel Wash Systems, Admitted Prior Art, One Page.
Grizzly Trackout Control Device Brochure, Printed From www.rumblegrate.com Oct. 11, 2019, Two Pages.

\* cited by examiner

*Primary Examiner* — Robert J McGarry, Jr.
(74) *Attorney, Agent, or Firm* — Merchant & Gould P.C.

(57) ABSTRACT

A system for cleaning tires of a vehicle traveling along a longitudinal direction over the system includes modular tire cleaning units with debris removal elements. Each unit includes debris removal elements, such as a first chain assembly supported between supports and over a substrate and extending substantially transverse to the longitudinal direction, the first chain assembly defining a first tire track. A second chain assembly is supported between second sets of supports and over the substrate and extending substantially transverse to the longitudinal direction, the second chain assembly defining a second tire track parallel and spaced apart from the first tire channel. The system may include a second modular tire cleaning unit with longitudinally extending chains and/or a trough holding water and/or sprayers at the side of the system.

21 Claims, 36 Drawing Sheets

TRUCK TRACKOUT CLEANING SYSTEM

BACKGROUND OF THE INVENTION

Field of the Invention

The present invention is directed to a tire cleaning system and in particular to a tire cleaning system used to remove mud and other material that may cling to tires, such as at construction sites.

Description of the Prior Art

Vehicles leaving certain areas, such as construction sites, often have mud and other materials cling to their tires. Therefore, as the vehicles leave the site, they track material onto adjoining roadways. This material can create safety hazards such as slippery driving conditions and contribute to sediment pollution in waterways. The material leaving the site must be periodically or continually swept and removed. By reducing or eliminating the amount of material on the tires for trucks leaving the construction site, the discharge of sediment and pollutants to surface waters can be reduced or eliminated. It can further be appreciated that in addition to the amount of materials, the soil and mud that is deposited after leaving the worksite may include heavy metals and other pollutants from the construction site that worsen the effects of the pollution. Containing such contaminated materials so that they do not leave the site provides environmental benefits. These issues can be addressed by cleaning the tires as the trucks exit the work site.

Systems have been developed that reduce or eliminate soil and mud clinging to vehicles leaving work zones and entering off site areas. Common systems include spreading rock such as stone or gravel, pads, shaker racks and wheel washers. Although such systems do reduce the amount of material clinging to tires and trucks leaving the work site, each system has drawbacks.

Rock systems use gravel that interacts with the tire surfaces to remove mud and other materials clinging to the tire treads. Such systems tend to work very well initially. However, after extended use, the mud and other materials mixes into the gravel and the interaction with the tire tread from the gravel is reduced. Therefore, over time, less of the material is removed from the tire treads. Although additional rock may be added, the material mixed with the rock may need to be hauled away, causing further disposal issues.

Track out pads and mats are utilized that are placed over the ground as temporary structures. Such mats tend to be made from flexible materials that engage the tire treads to remove material. Such pads and mats may protect the underlying ground, but tend to fail during heavy use from the weight of the equipment passing over them.

Shaker racks have been developed and are also known as exit grids, rumble strips, rumble racks and rumble plates. Such devices impart shaking or vibration to the equipment passing over them. The bars also act to scrape material as the tires pass over. Although such devices may work for some applications, they may be ineffective for heavy, wet mud. Moreover, the vibration and shaking imparted to the trucks may cause damage to the trucks and require added maintenance. Therefore, drivers often simply drive around these devices to prevent damage to their vehicles.

Wheel washer systems or washer racks utilize high-pressure water to remove the mud, soil and rocks from vehicles exiting the site. Although temporary systems may be utilized, such systems tend to be expensive and also use large volumes of water that may create additional runoff that requires disposal of the water slurry that forms and may not be compliant for local storm water runoff regulations.

It can be seen then that a new and improved system and method for cleaning tires of vehicles leaving certain sites is needed. Such a system should provide for efficiently and thoroughly cleaning mud and other materials from tires prior to vehicles leaving the sites. Such a system should also provide adequate space below the system for debris to accumulate without adversely affecting its performance. Such a system should avoid the use of additional rock for removal. Moreover, a tire cleaning system should be adaptable to use sprayers or pans of water in conjunction with mechanical removals elements. In addition, the system should also provide for removal without undue shaking and vibration to the trucks passing over it. Such a system should also be simple and inexpensive to manufacture and be sturdy and reliable. The present invention addresses these as well as other problems associated with cleaning dirt, mud and other material from vehicles departing work sites.

SUMMARY OF THE INVENTION

The present invention is generally directed to a tire cleaning system. The cleaning system provides removal elements that engage vehicle tires to remove dirt, mud and debris as the vehicle passes over the system and elevates the elements to provide a volume to receive material removed from the tires. In one embodiment, the tire cleaning system has a modular configuration including at least one cleaning module with ramps at either end. Each tire cleaning module defines tracks on which the vehicles may drive to clean the tires. It can be appreciated that multiple modules may be joined together to form an extended tire cleaning system. Moreover, different types of tire cleaning modules may be joined together and mixed and matched for different types of action on the vehicle tires.

Each module generally includes two track units that are connected by an intermediate or center frame. The track units form the spaced apart parallel tracks. Each of the track units includes a frame that supports chains. In the embodiment shown, the chains extend transversely to a direction of travel. The track units of each module include a frame with side elements and I-beams. Cross members connect the longitudinally extending members. The track unit frame raises the chains upon which vehicles travel and provides sufficient volume for dirt, mud and other debris that is removed from the tires to fall into without clogging the chains and adversely affecting cleaning effectiveness.

The chains are supported laterally and are allowed to sag somewhat with the ends supported at a position higher than the center, which allows the chain to be pressed further downward by the tire treads so that portions of the chains brush up against at least some of the sidewall of the outer vehicle tires. Moreover, the raised ends and lower center provide a degree of self-centering for vehicles traversing the tire cleaning system.

The chains are attached at their ends to mounting rods supported by welding or rod support brackets. I-beams support the center of the chains while maintaining the chains raised above the underlying surface to provide for dirt and debris to fall through the chains without clogging the chain links. In a first embodiment, the chains extend laterally in a close side-by-side configuration and form an extended track over which the vehicles traverse. The chains act as a natural cleaning element as the tires engage the chains and remove dirt and debris from the treads of the tires. Moreover, the chains are characteristically durable and require no special manufacture and mounting.

Depending on the site and the tire cleaning needs, different types of modules may be used and/or joined together. In a second embodiment of a tire-cleaning module, a different configuration is used for supporting chains. In a second embodiment, the chains of the track-cleaning module extend longitudinally along the direction of travel. The ends of the chains are retained by a spring element attaching to one of the cross members.

As a vehicle traverses the track unit, only the chains engaged by the tires are pushed somewhat downward so that the chains engaged by the tires sag between each of the cross members. However, the chains immediately laterally spaced from the depressed chains will rub against sidewalls of the tires. Therefore, these chains engage the sidewalls and have a scraping effect and help to clean caked on mud and other debris from the sidewalls of the tires. Moreover, it can be appreciated that the combination of a module having laterally extending chains with a module having longitudinally extending chains provides different cleaning actions on the tires of a vehicle and can achieve improved tire cleaning.

In a further embodiment of a tire-cleaning module, chains extend longitudinally along the direction of travel along the module. However, instead of being attached at the ends, the chains are continuous, and form a loop that extends around cross members and end cylindrical members. Therefore, the chains can rotate around the loop formed over and around the cross-members and the end members. The rotating chains are self-cleaning to some degree may help to keep the chains from building up further mud and debris to improve effectiveness.

A yet further embodiment of a track-cleaning module is generally configured as a pan formed by the bottom, sides and ends of each track unit that holds water to help with washing the tires of vehicles passing through the trough formed by the module. The track unit of each of these modules includes inner ramp portions to aid in driving over the ends.

The trough-type track-cleaning module may be joined to other modules to create an extended tire cleaning system. In addition, different types of modules including may be joined together to form an extended tire cleaning system with various mixing and matching of chain configurations and/or a trough to clean the tires as vehicles traverse the system.

The tire cleaning system may also be configured for use as a portable trailer. This configuration includes an elongated pair of tracks joining the center frame with each of the tracks including ramps. Wheel and axle assemblies provide for transport to various locations. The tire and axle assemblies may be removably mounted for placing the system directly on the ground after transport to the use site. A towing portion is mountable at the end opposite the tire, axle and wheel assemblies.

The various modules in the tire cleaning system may be supplemented with sprayers. Such sprayers may be particularly configured to remove material from the sides of tires that are not engaged by chains. Spray nozzles may be positioned along the sides of modules to supplement the action of chains and to target sidewalls of the tires. For some sites, mud may build up on the sides of truck tires and spraying may be useful to remove the material that is not engaged by the chains.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

BRIEF DESCRIPTION OF THE DRAWINGS

Referring now to the drawings, wherein like reference letters and numeral indicate corresponding structure throughout the several views.

DETAILED DESCRIPTION OF THE PREFERRED EMBODIMENT

Figure 1:
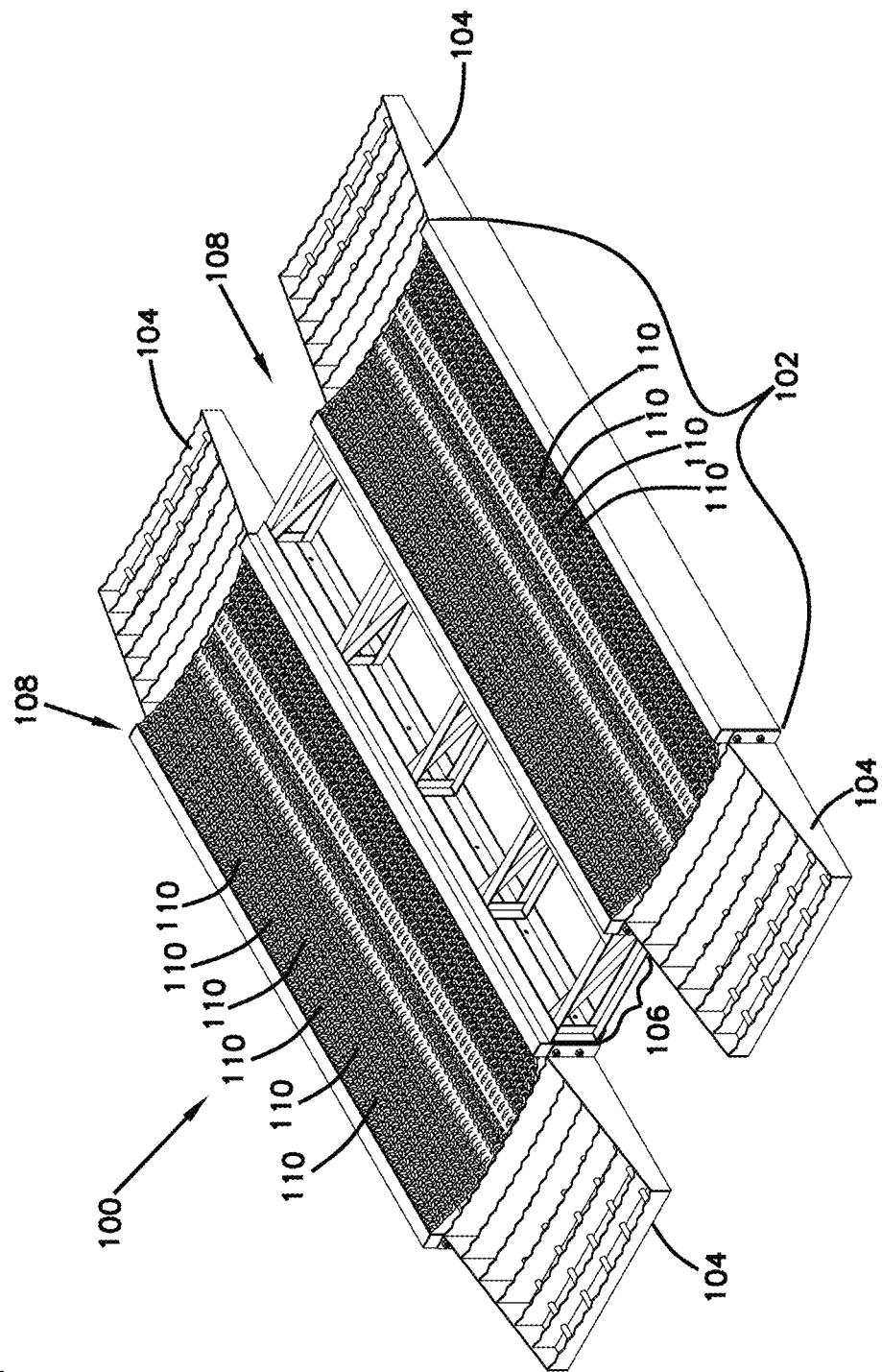
FIG. 1 is a perspective view of a vehicle tire cleaning system according to the principles of the present invention.
Figure 2:
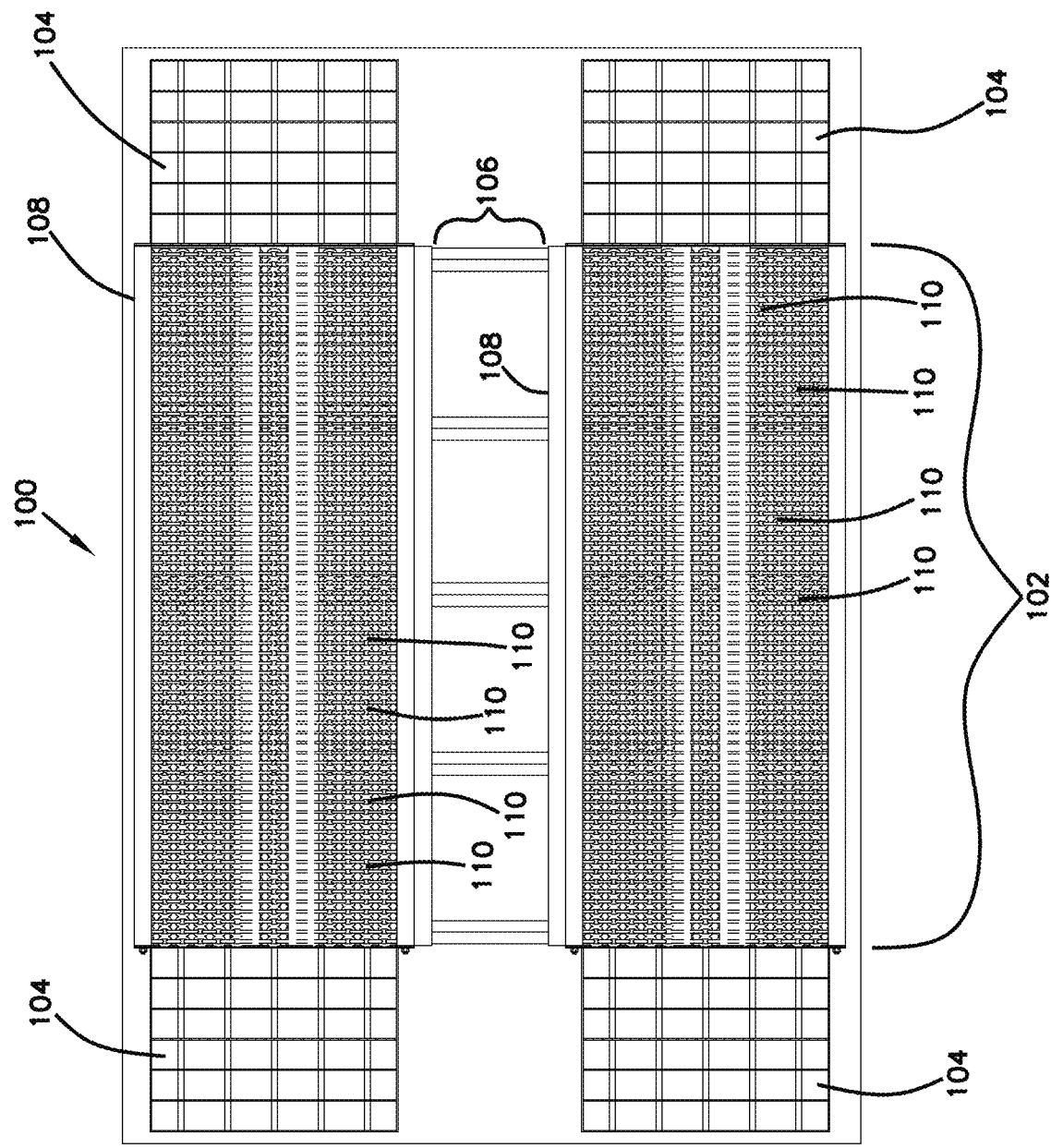
FIG. 2 is a top plan view of the vehicle tire cleaning system shown in FIG. 1.
Figure 3:
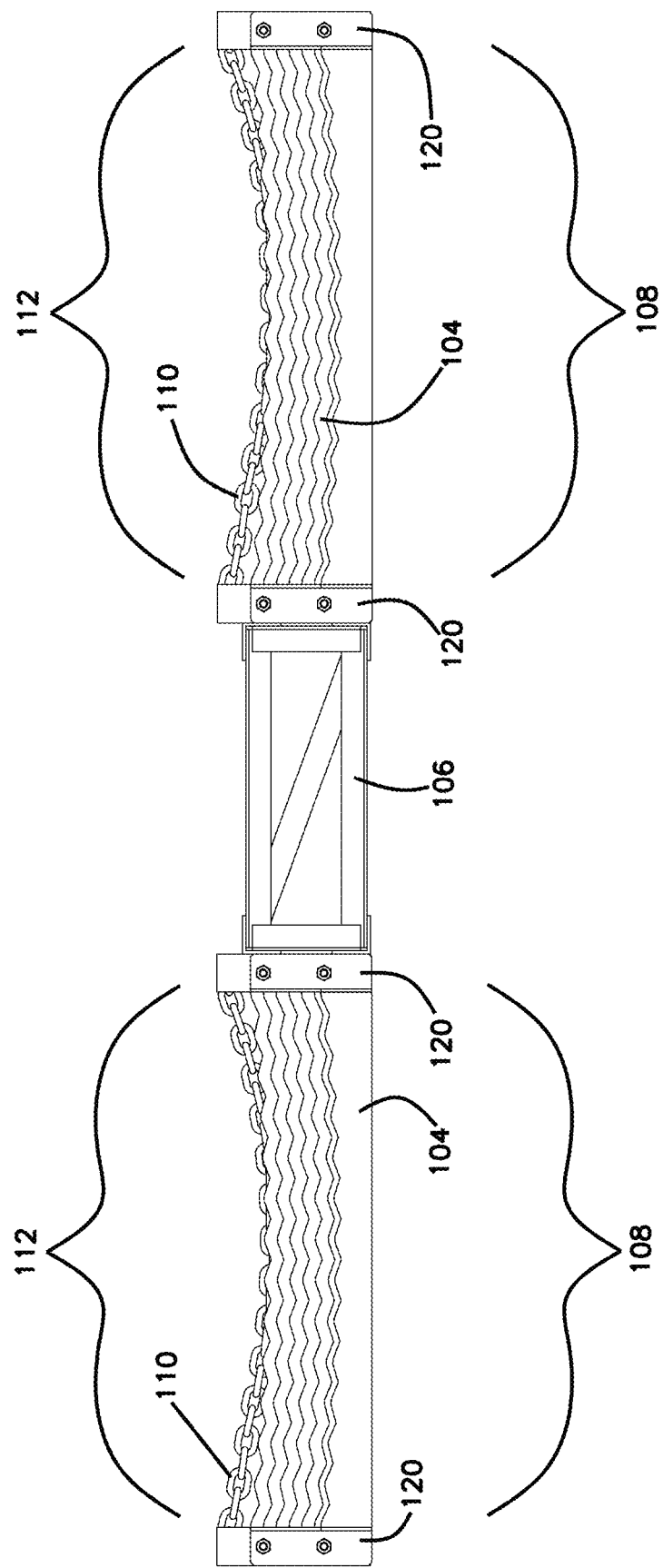
FIG. 3 is an end view of the vehicle tire cleaning system shown in FIG. 1.
Figure 4:
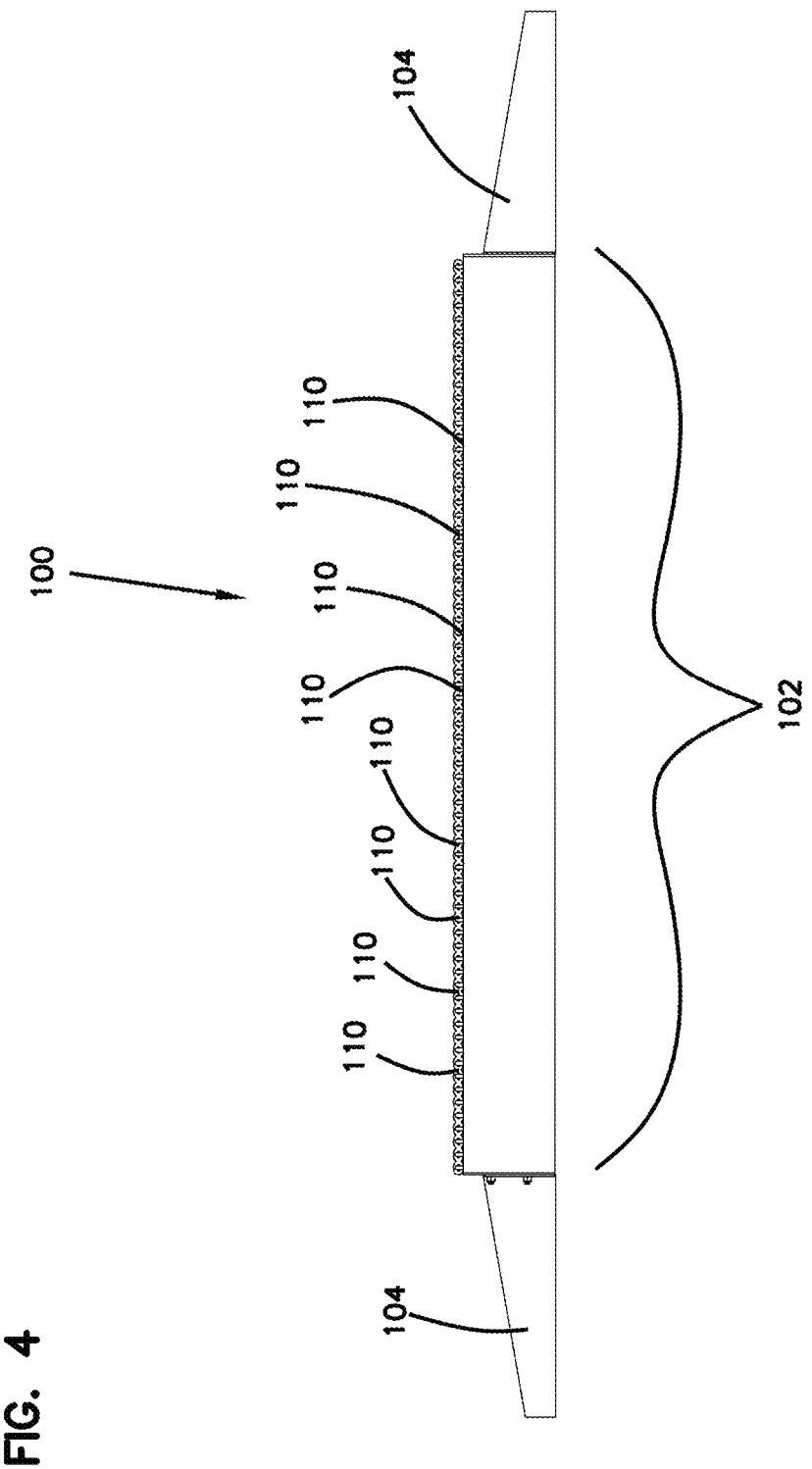
FIG. 4 is a side elevational view of the vehicle tire cleaning system shown in FIG. 1.

Referring now to the drawings and in particular to FIGS. 1-5, there is shown a tire cleaning system, generally designated (100). The cleaning system (100) provides removal elements that engage vehicle tires to remove dirt, mud and debris as the vehicle passes over the system and elevates the elements over the ground or other substrate to provide a volume to receive material removed from the tires. The tire cleaning system (100) includes a cleaning module (102) with ramps (104) at either end. The module (102) defines tracks (112) on which the vehicles may drive to clean the tires. It can be appreciated that multiple modules (102) may be joined together to form an extended tire cleaning system (100). Moreover, different types of tire cleaning modules may be joined together and mixed and matched for different types of action on the vehicle tires.

Figure 5:
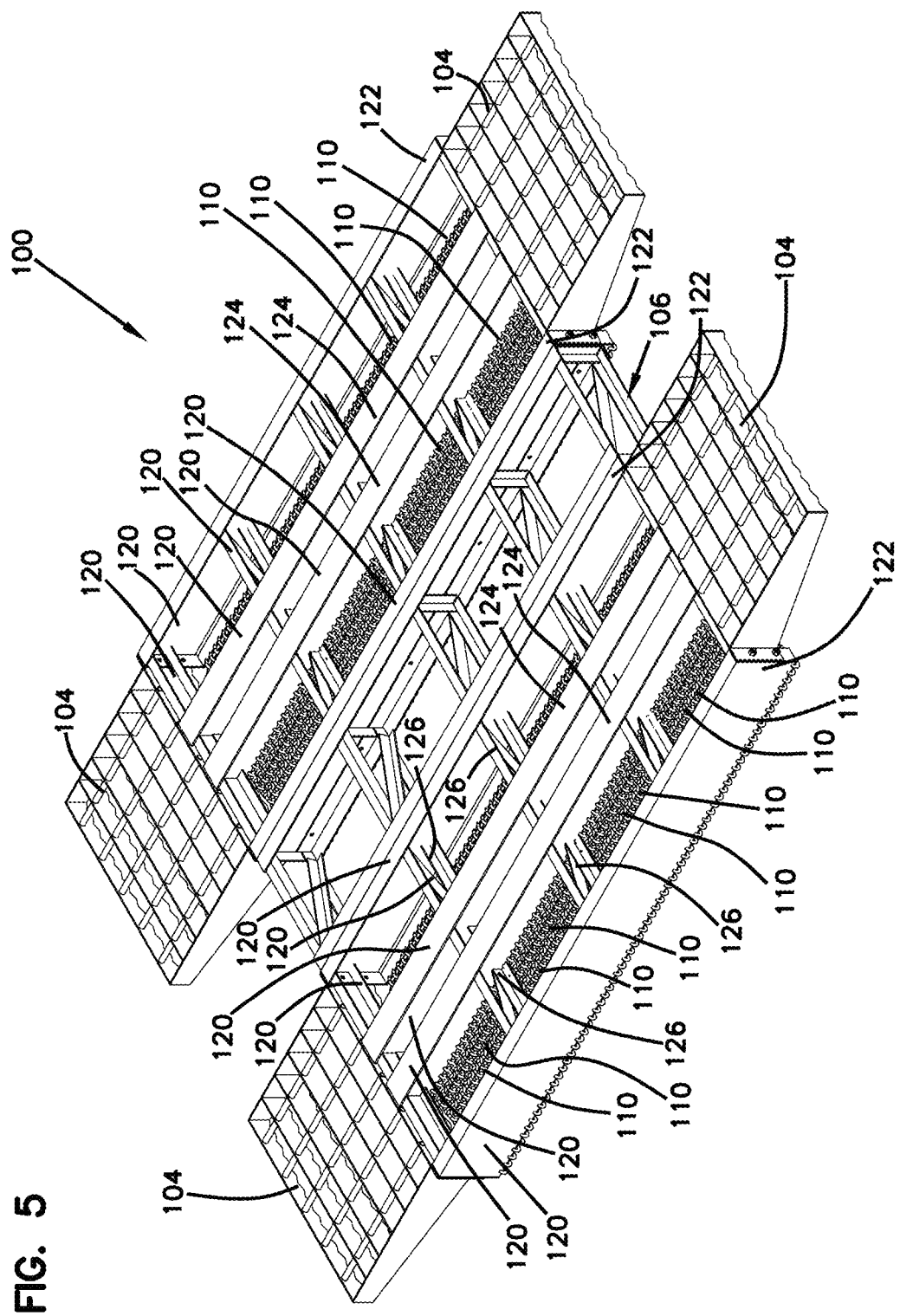
FIG. 5 is a bottom perspective view of the vehicle tire cleaning system shown in FIG. 1.

The module (102) generally includes two track units (108) that are connected by an intermediate or center frame (106). The track units (108) form the spaced apart parallel tracks (112). Each of the track units (108) includes a frame (120) that supports debris removal elements (110), which are chains in the embodiment shown. The debris removal elements (110) should have sufficient obstructions to remove material clinging to tires. In the embodiment shown, the chains extend transversely to a direction of travel. As shown in FIG. 5, the track units (108) of the module (102) includes a frame (120) with side elements (122) and I-beams (124). Cross members (126) connect the longitudinally extending members (120, 124). Moreover, it can be appreciated that the track unit frame (120) raises the chains (110) upon which vehicles travel above the ground or other substrate and provides sufficient volume for dirt, mud and other debris that is removed from the tires to fall into without clogging the chains (110) and adversely affecting cleaning effectiveness. The debris removal elements (110), such as chains create voids for the debris to fall through. The debris removal elements (110) are free of a floor or other barrier layer on which debris removed from tires would accumulate and potentially interfere with further removal of debris from tires. It can also be appreciated that if the cleaning system is used for a small or job or a short time, it may not be necessary to elevate the debris removal elements (110).

Figure 6:
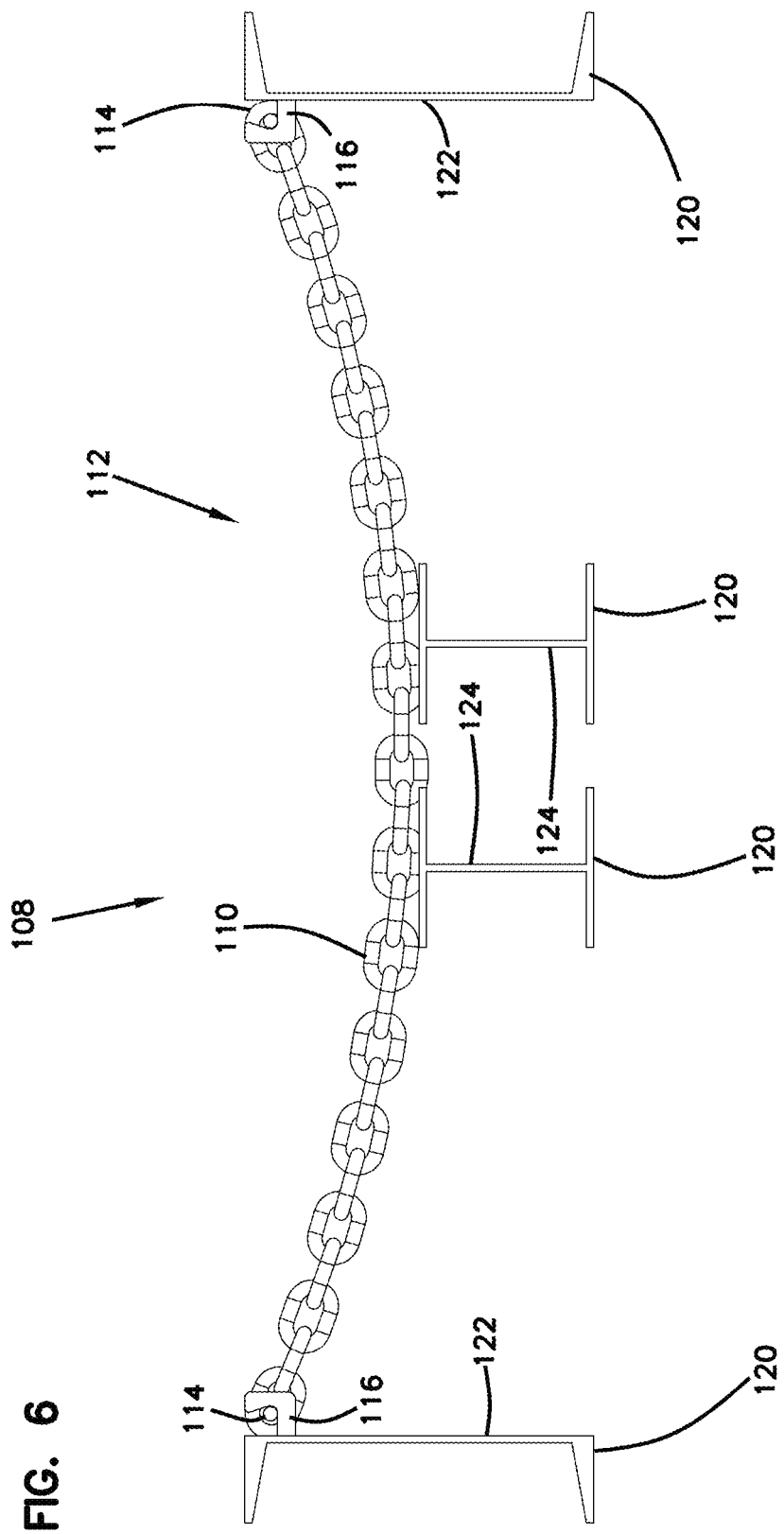
FIG. 6 is an end view of a length of chain mounted to the frame for the vehicle tire cleaning system shown in FIG. 1.
Figure 7:
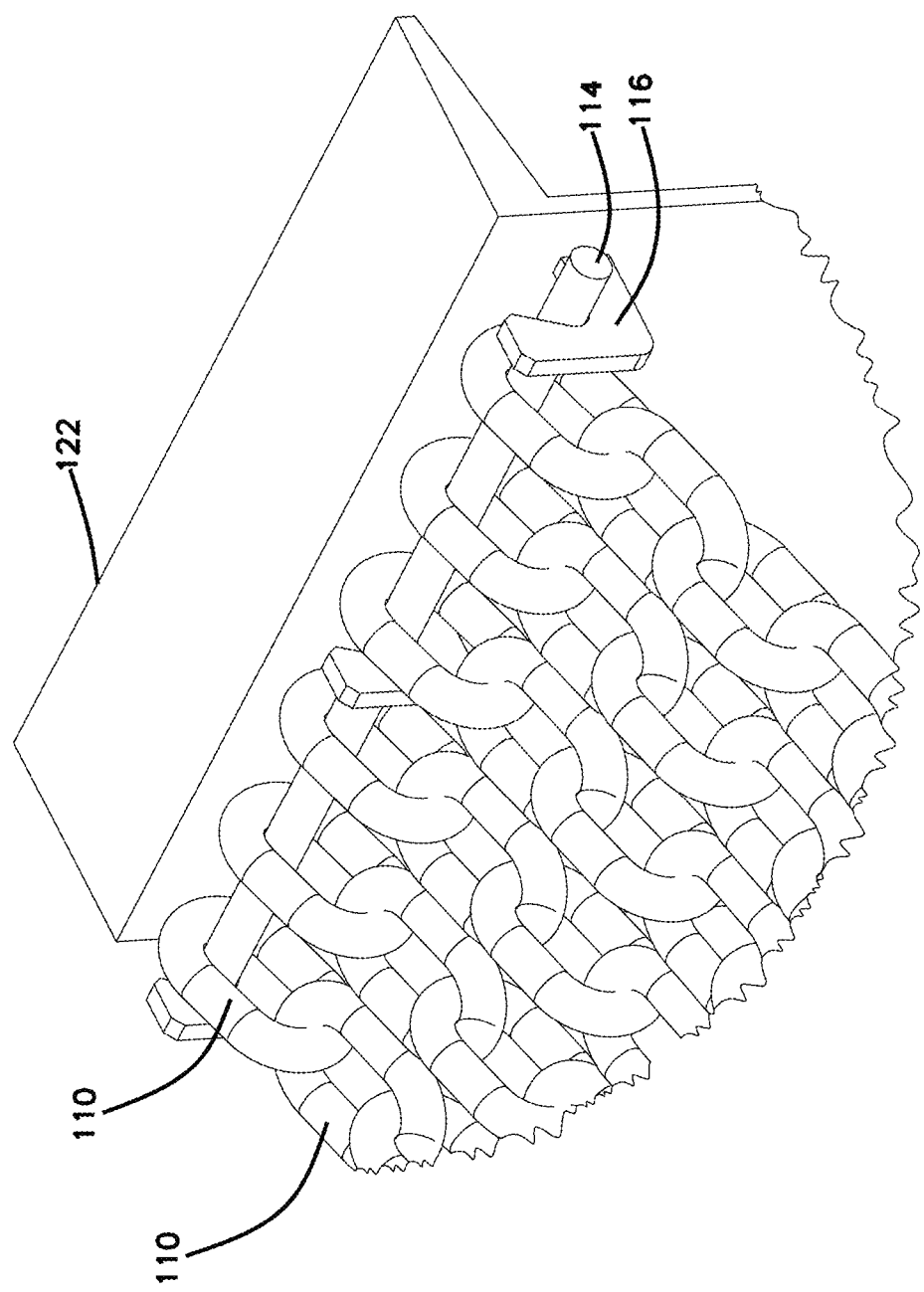
FIG. 7 is a perspective view of multiple chains and a mounting assembly for the vehicle tire cleaning system shown in FIG. 1.
Figure 8:
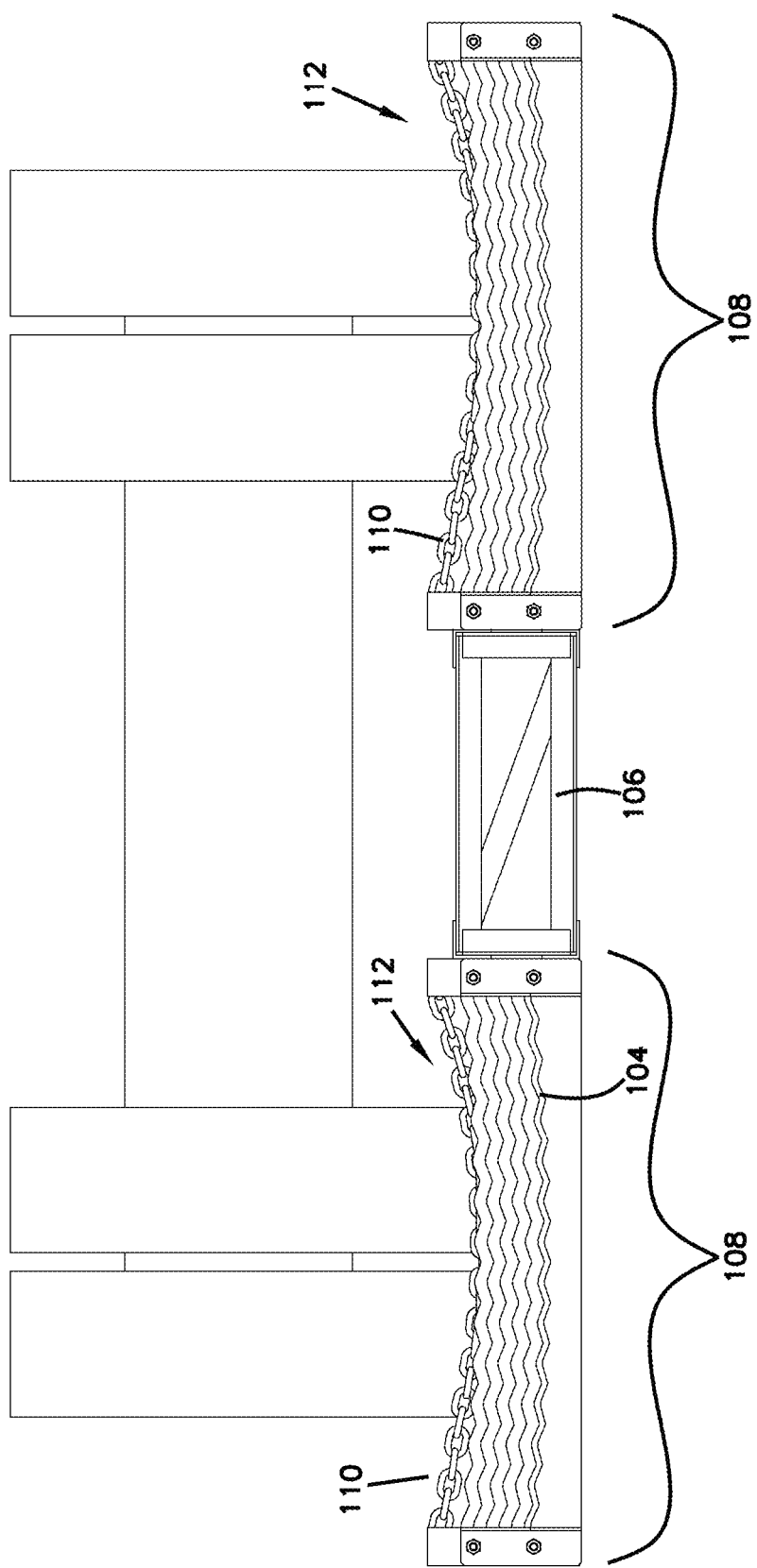
FIG. 8 is an end view of the vehicle tire cleaning system shown in FIG. 1 with a truck traversing the chains.

Referring now to FIGS. 6-8, the chains (110) are supported laterally and are allowed to sag somewhat with the ends supported at a position higher than the center. The track formed by the chains of the debris removal elements (110) substantially aligns with tires of vehicles passing over the tire cleaning system (100). Two tracks are formed by the spaced apart sets of chains (110) that substantially align with left and right side tires of vehicles passing over the tire cleaning system (100). The chains (110) sag to form a channel that helps to self-center tires passing over the track. With this configuration, the chains (110) are pressed further downward by the tire treads so that portions of the chains brush up against at least some of the sidewall of the outer vehicle tires. Moreover, it can be appreciated that the raised ends and lower center provide a degree of self-centering for vehicles traversing the tire cleaning system (100).

The chains (110) are attached at their ends to mounting rods (114) supported by rod support brackets (116). The rods (114) and the brackets (116) provide a simple and easy support of the chains (110) and easy replacement should a length of chain (110) need replacement or adjustment. Moreover, the I-beams (124) support the center of the chains (110) while maintaining the chains raised above the underlying surface to provide for dirt and debris to fall through the chains without clogging the chain links. In other embodiments, the chains (110) may also be welded or otherwise mounted to the framework in a sturdy manner.

It can be appreciated that with the chains (110) extending laterally in a close side-by-side configuration, an extended track (112) is formed over which the vehicles traverse. The chains (110) act as a natural cleaning element as the tires engage the chains and remove dirt and debris from the treads of the tires. Moreover, the chains (110) includes voids that all the debris to fall through the chains and are characteristically strong and long lasting and require no special manufacture and mounting. It can also be appreciated that as the vehicles pass, a wave may form through the chains (110) by the tires pushing the chains (110) as the vehicle traverses the tire cleaning system (100).

Figure 9:
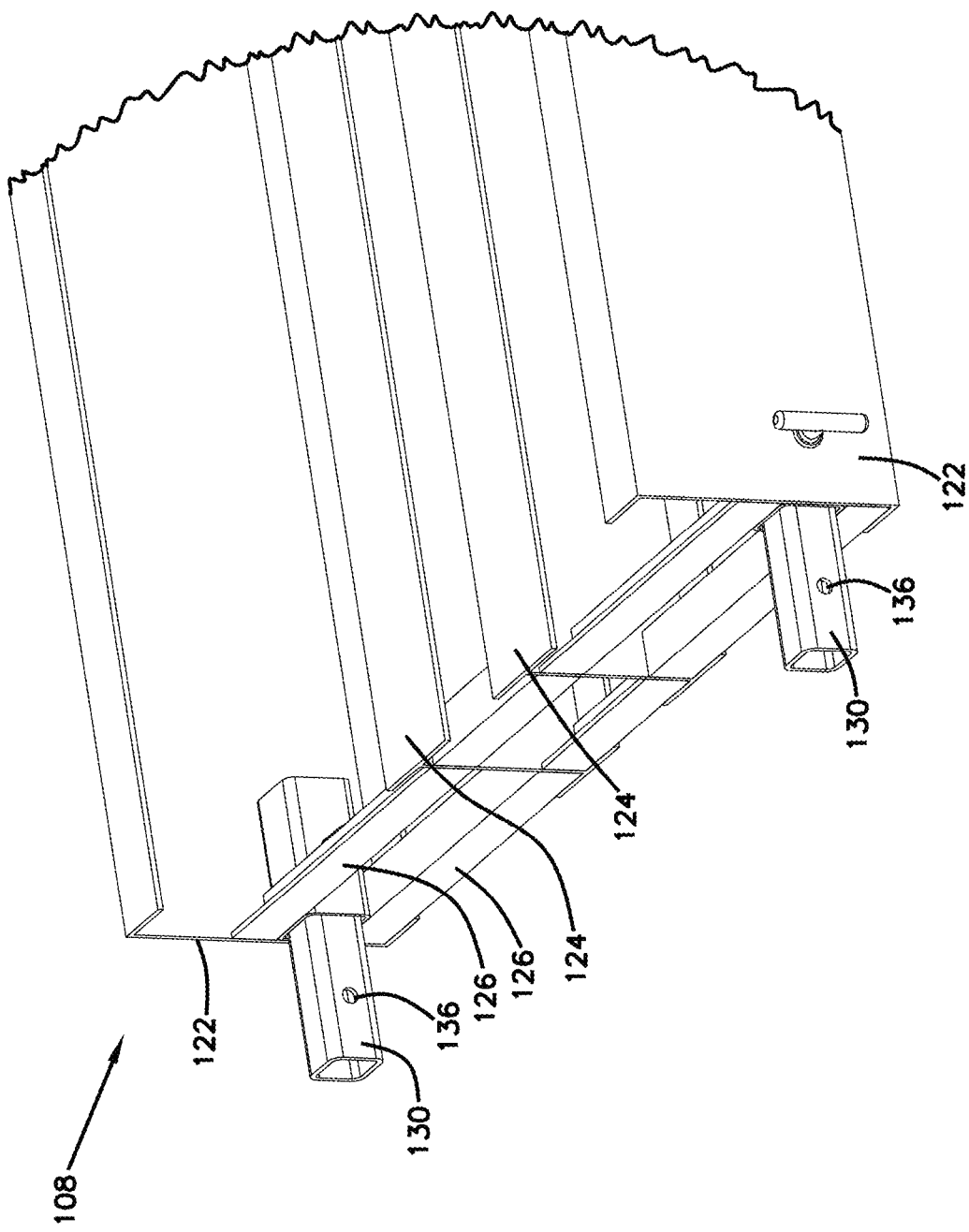
FIG. 9 is a perspective detail view of a cleaning module for the vehicle tire cleaning system shown in FIG. 1 and a coupling assembly for coupling to a second cleaning module.
Figure 10:
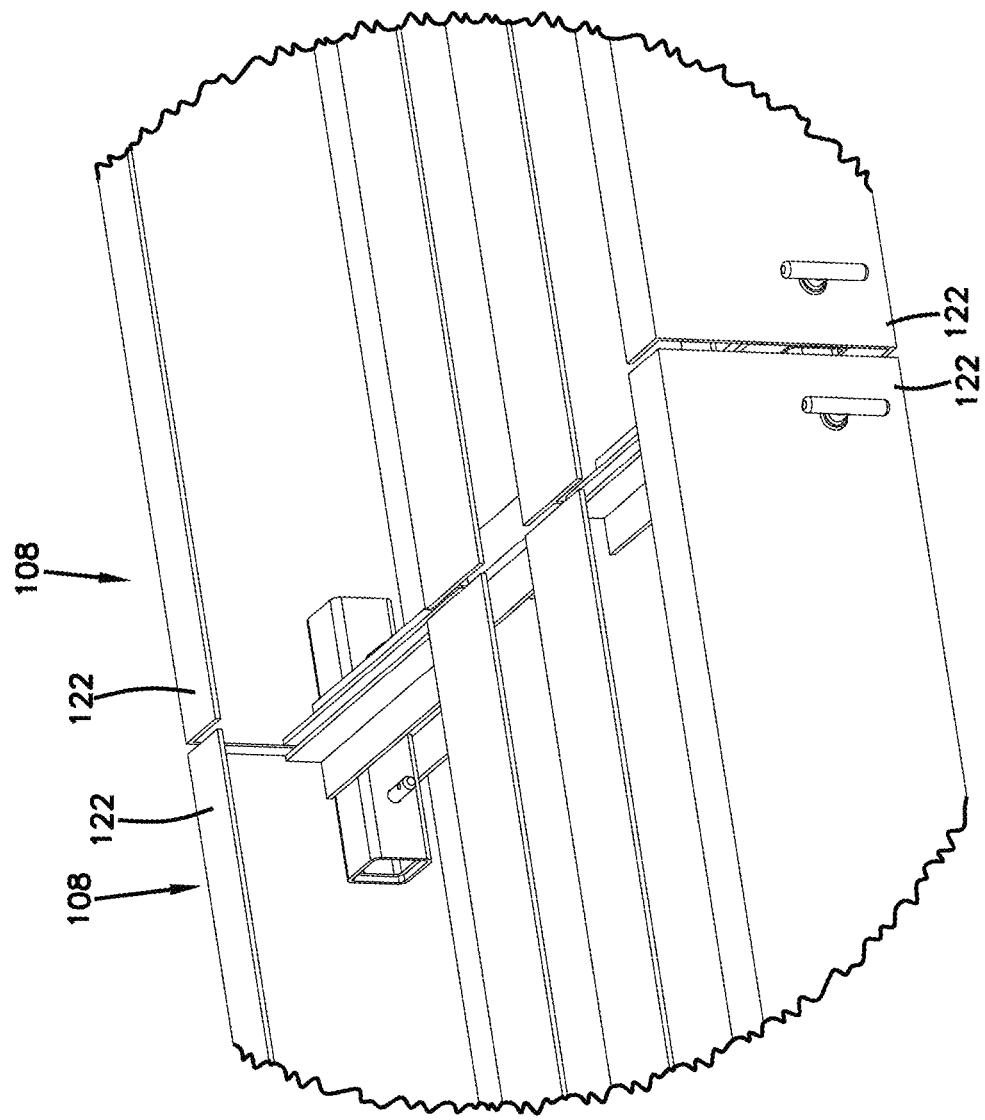
FIG. 10 is a perspective detail view of two coupled cleaning modules for the vehicle tire cleaning system shown in FIG. 1 and the coupling assembly.
Figure 11:
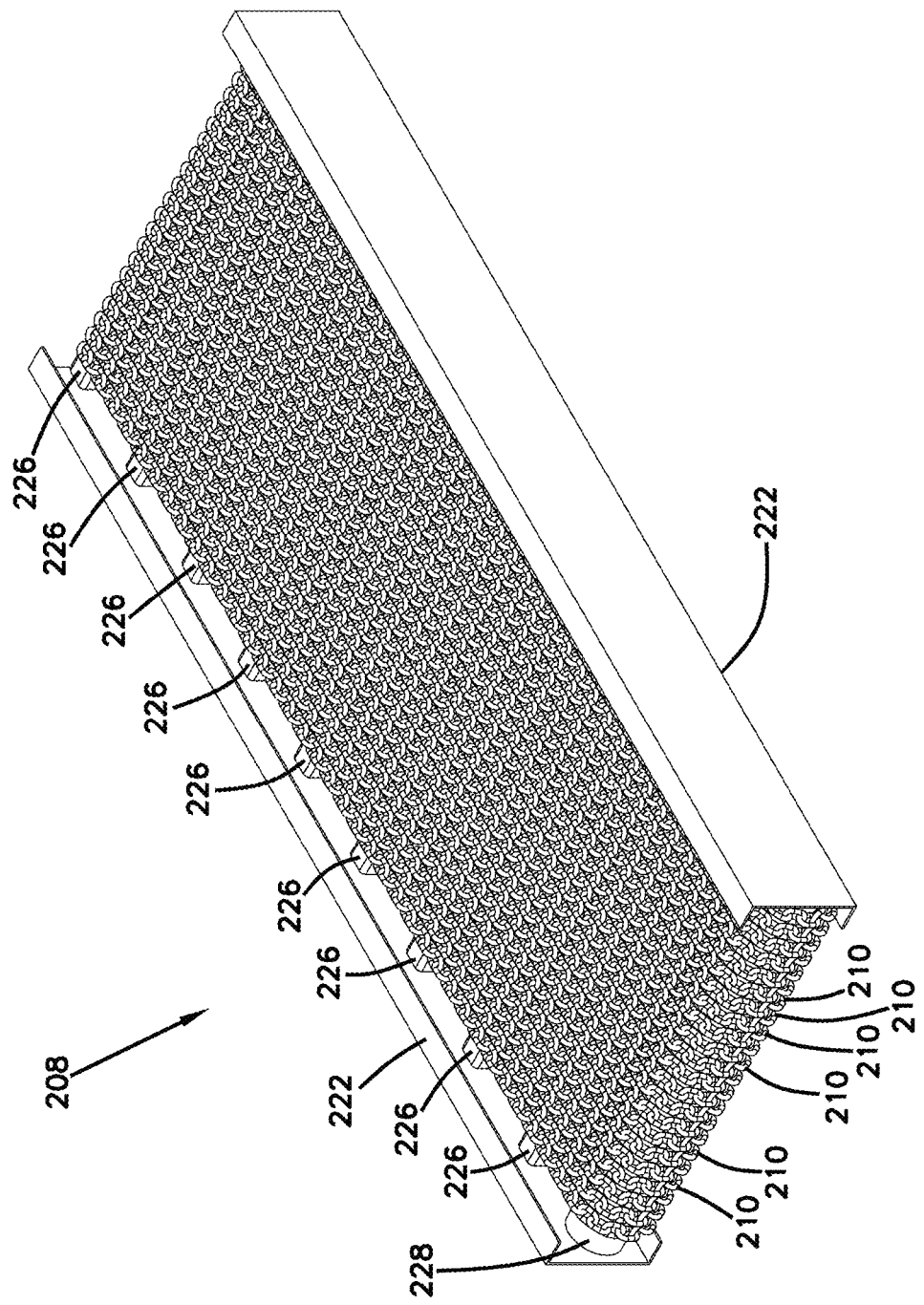
FIG. 11 is a perspective view of a first embodiment of a track segment for the vehicle tire cleaning system shown in FIG. 1.
Figure 12:
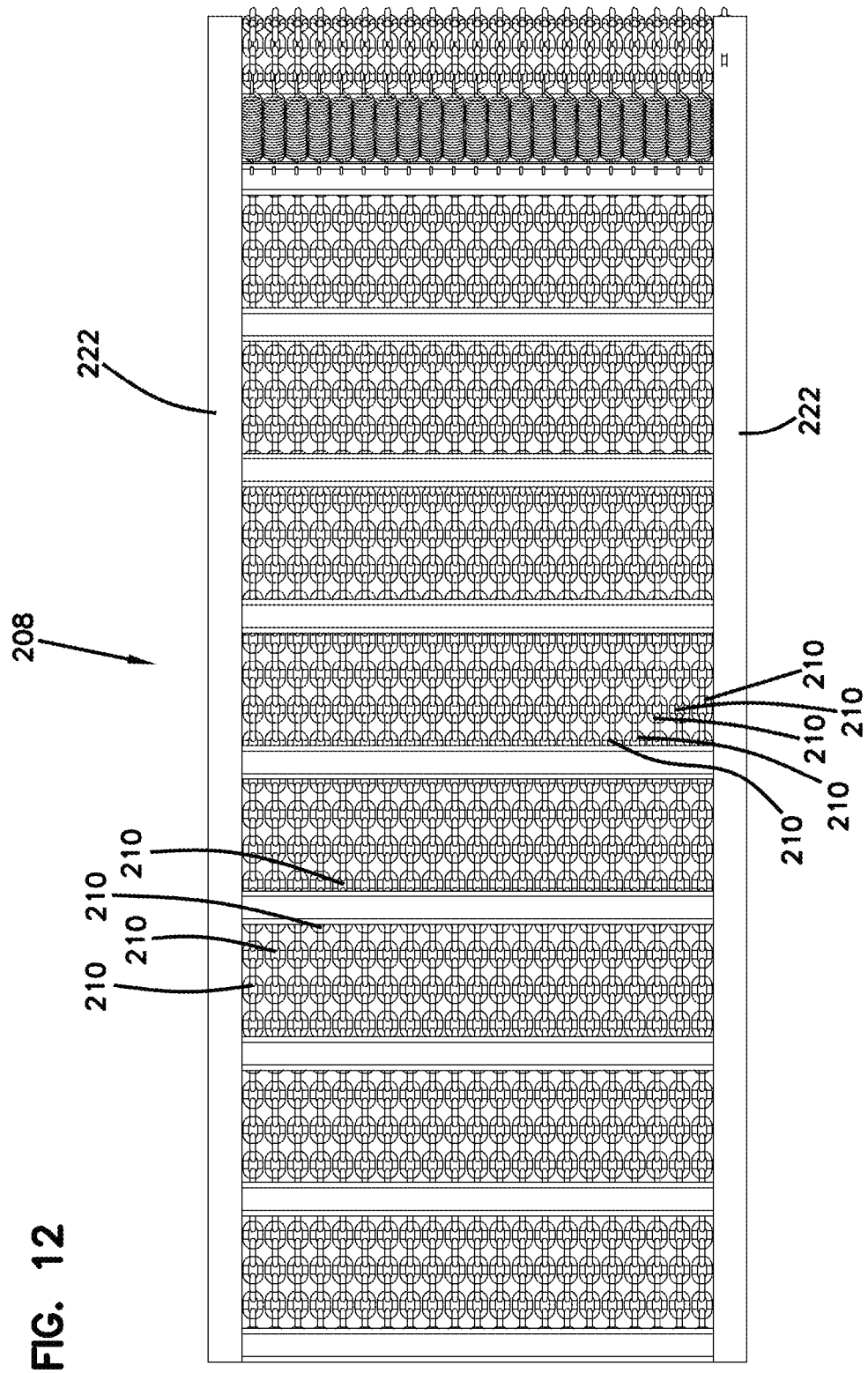
FIG. 12 is a top plan view of the track segment shown in FIG. 11.

Depending on the site and the tire cleaning needs, different types of modules (102) may be used and/or joined together. Referring now to FIGS. 9 and 10, there is shown a connecting system for connecting track units (108) in an end-to-end relationship. At least one of the ends of the frameworks of each track unit may include a connecting sleeve (132) receiving a complimentary rod (130). Orifices (136) formed through the elements receive a pin (134) to maintain the rod (130) in the corresponding sleeve. This in turn maintains the track units (108) and therefore the modules connected and aligned in an end-to-end relationship. In this manner, multiple different modules may be joined to form an extended cleaning system. As explained hereinafter, the system (100) may include different types of cleaning modules that may be mixed and matched.

Referring now to FIGS. 11-14, there is shown a second embodiment of a track unit, generally designated (208). The track unit (208) is similar to the track unit (108) but has a different configuration for supporting chains (210). It can also be appreciated that the track unit (208) may be joined with another track unit and an intermediate frame section to create a module similar to module (102). In addition, the module created by track units (208) may be joined to modules such as module (102) to create an extended tire cleaning system.

Figure 13:
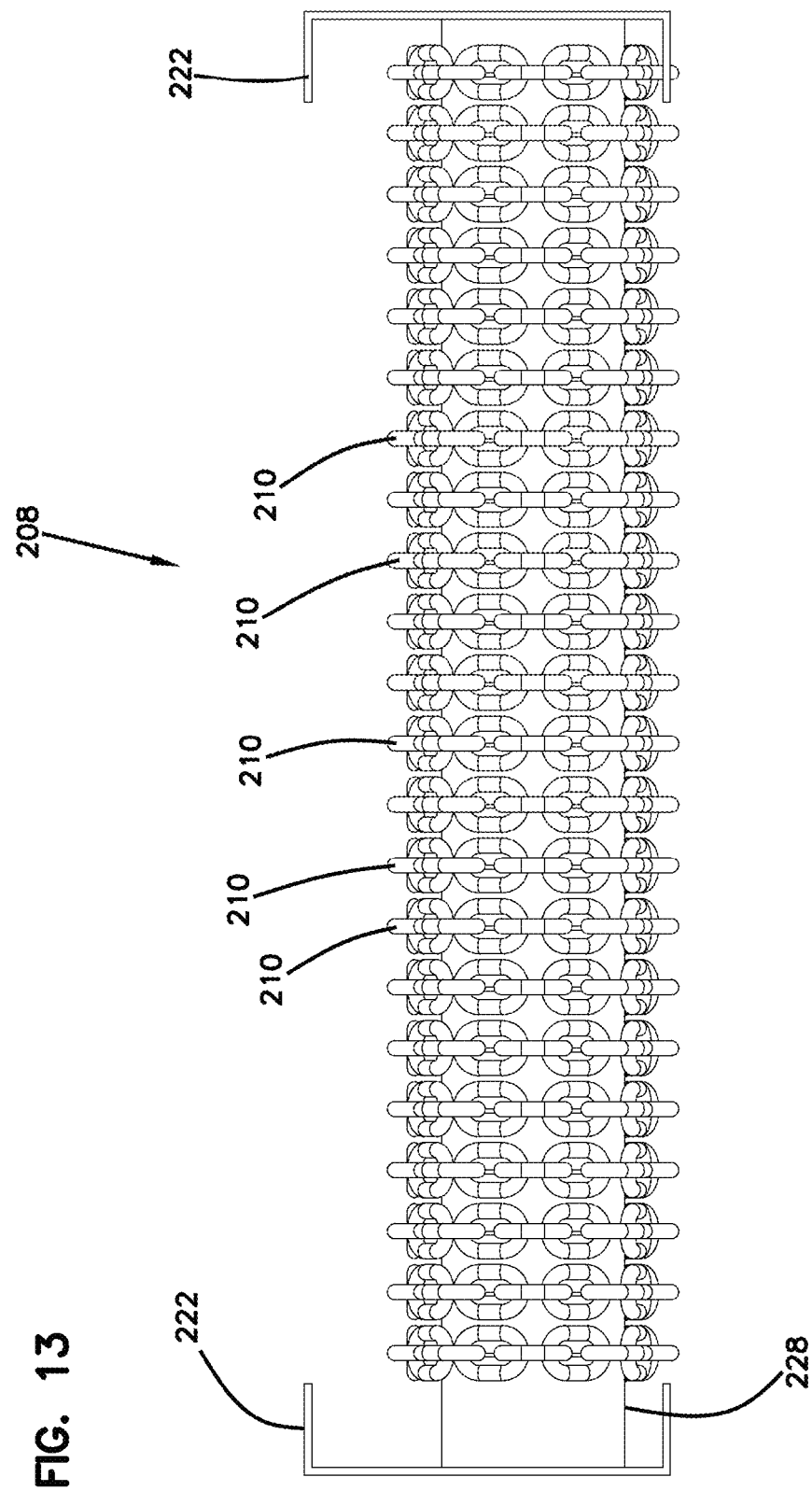
FIG. 13 is an end view of the track segment shown in FIG. 11.
Figure 14:
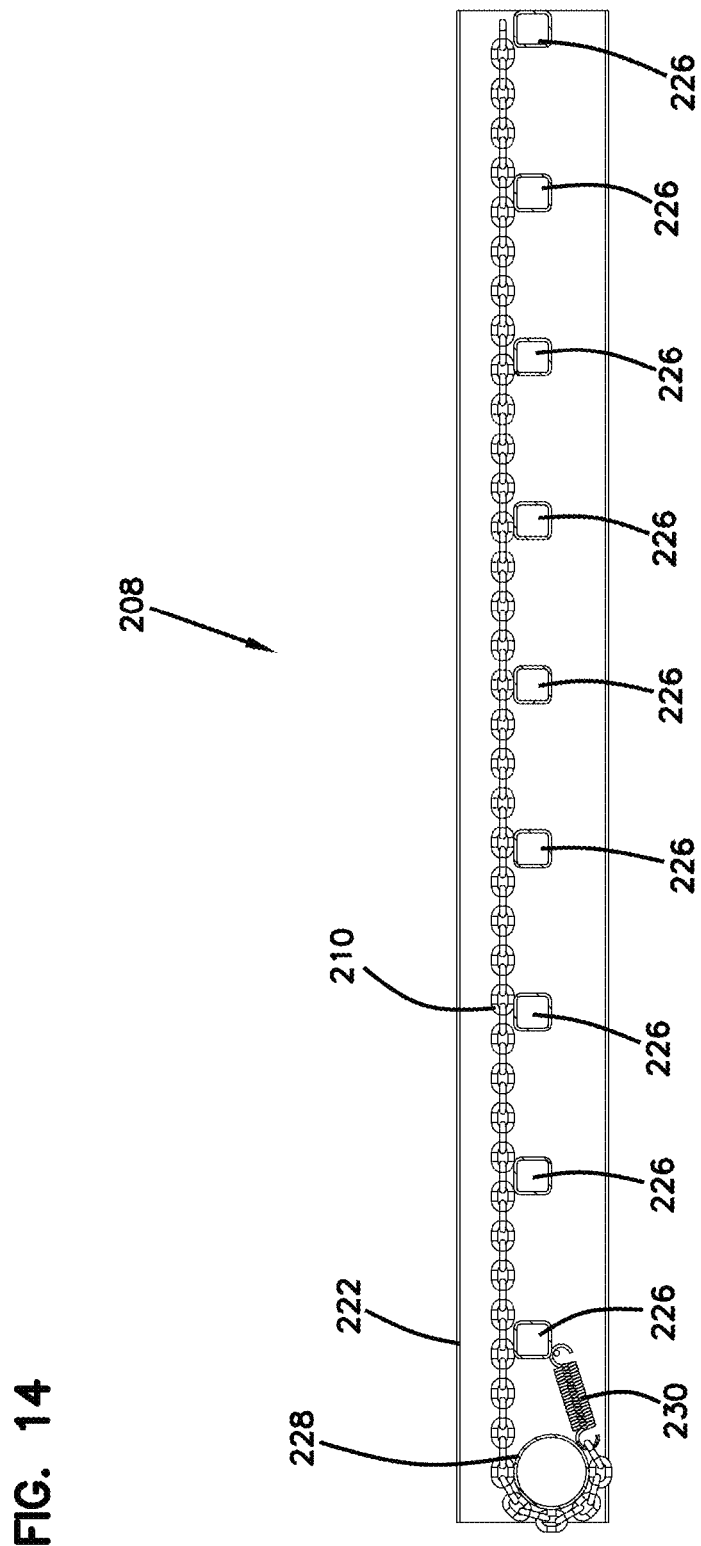
FIG. 14 is a side sectional view of the track segment shown in FIG. 11.
Figure 15:
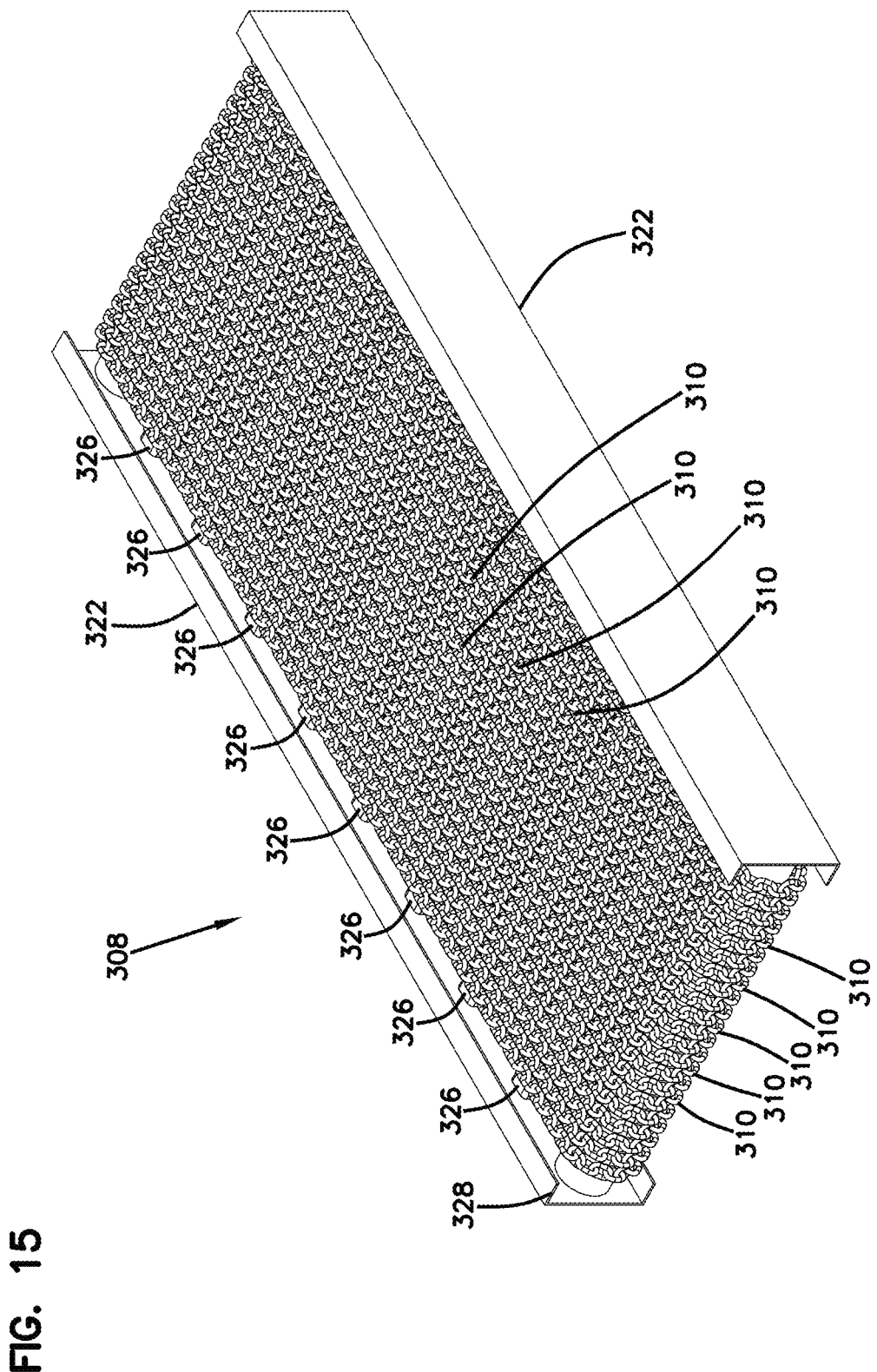
FIG. 15 is a perspective view of a third embodiment of a track segment for the vehicle tire cleaning system shown in FIG. 1.
Figure 16:
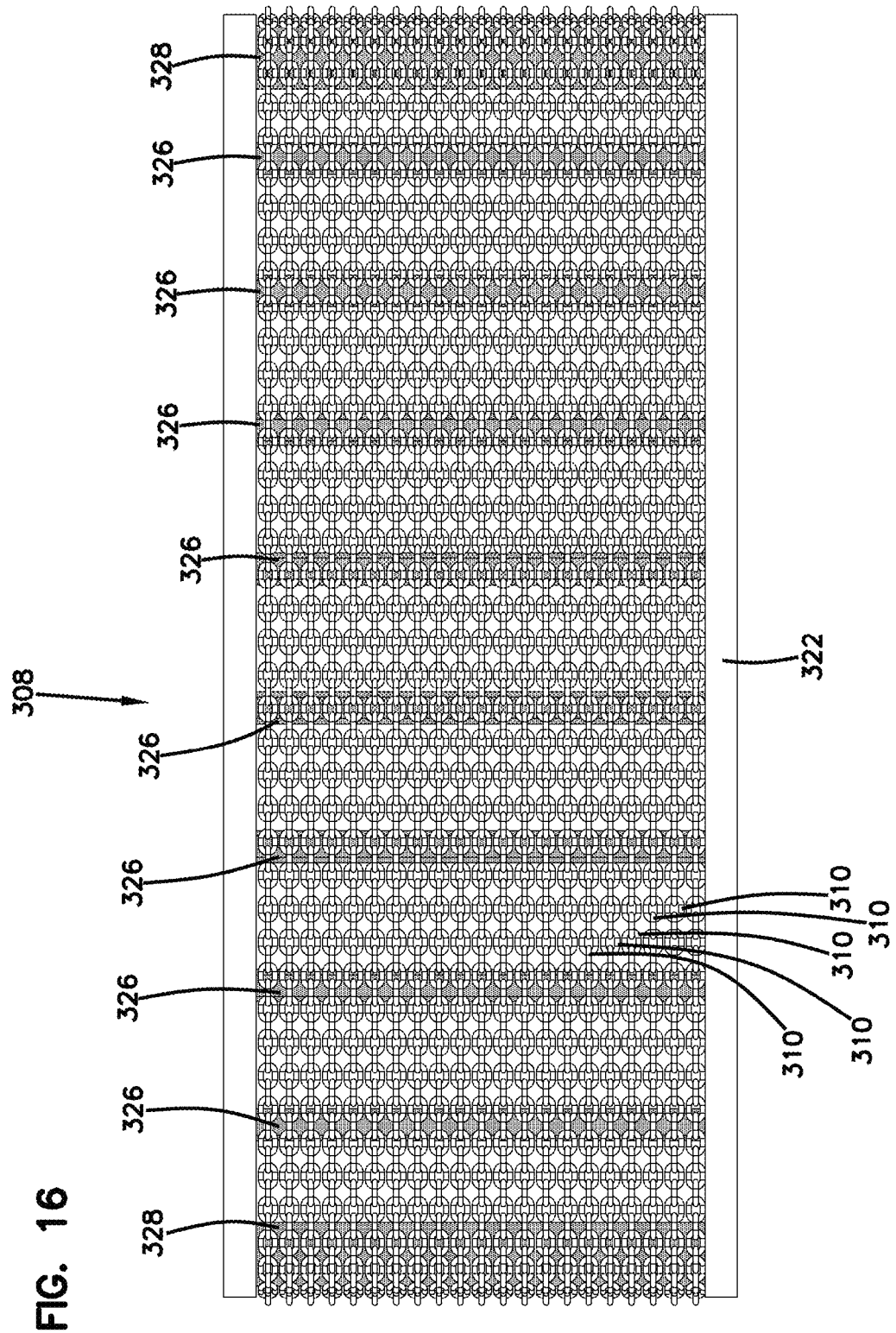
FIG. 16 is a top plan view of the track segment shown in FIG. 15.
Figure 17:
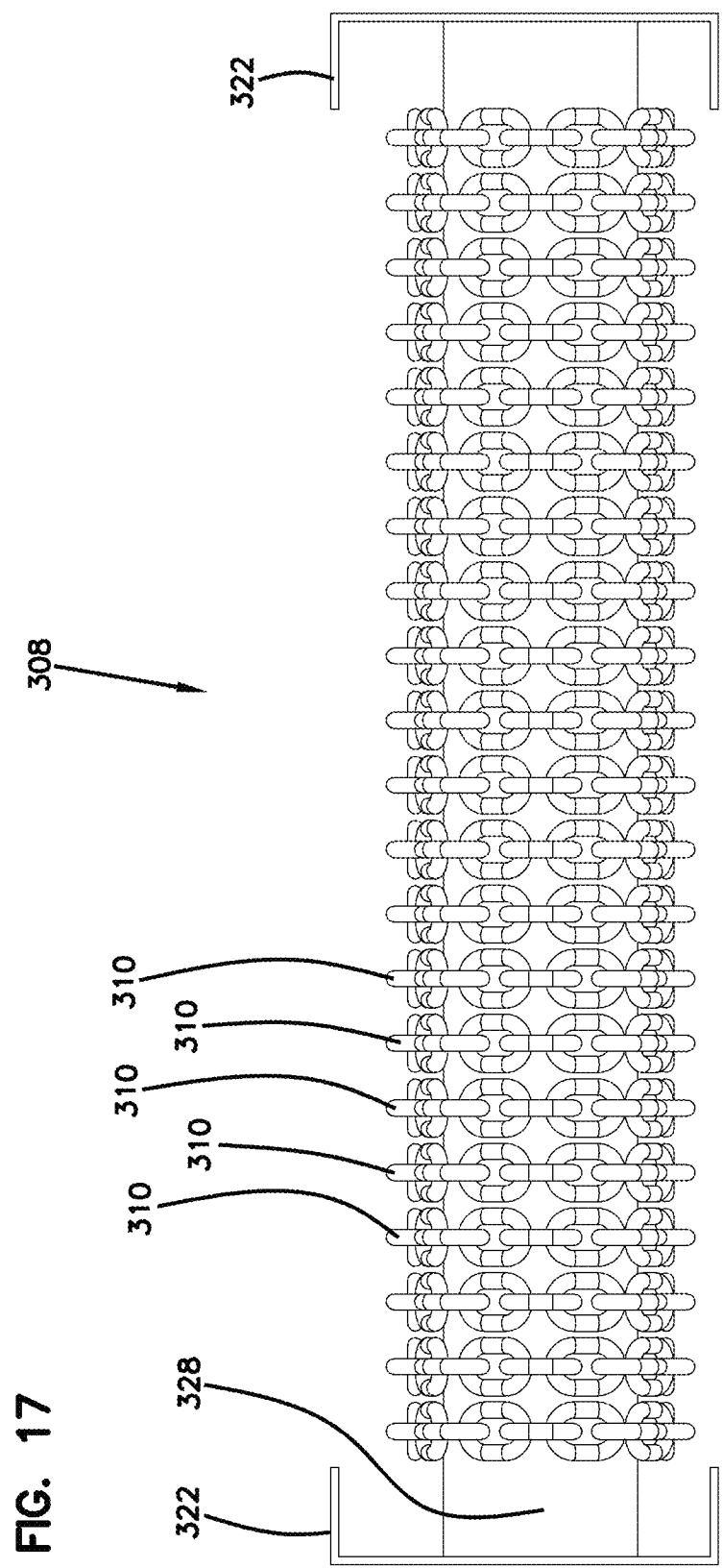
FIG. 17 is an end view of the track segment shown in FIG. 15.
Figure 18:
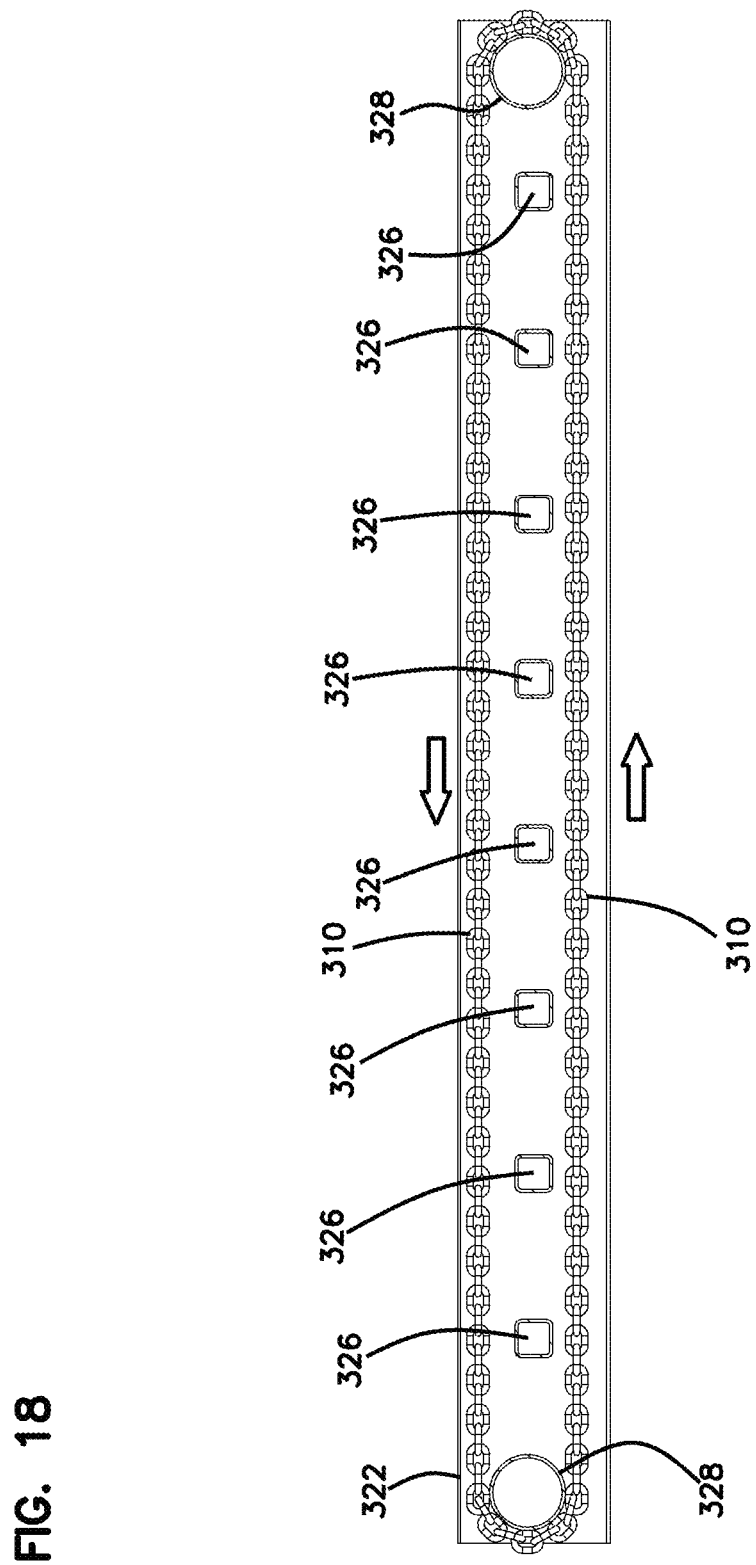
FIG. 18 is a side sectional view of the track segment shown in FIG. 15.

The tire cleaning track unit (208) includes side frame elements (222) and cross members (226). Unlike track unit (108), the chains (210) of the track-cleaning module (208) extend longitudinally along the direction of travel. The chains (210) extend around an end cylindrical cross member (228) as shown in FIGS. 13 and 14. The ends of the chains (210) are retained by a spring element (230) attaching to one of the cross members (226), as shown in FIG. 14.

The chains (210) are supported by the spaced apart cross members (226). As a vehicle traverses the track unit (208), only the chains (210) engaged by the tires are pushed somewhat downward so that the chains (210) engaged by the tires sag between each of the cross members (226). However, the chains (210) immediately laterally spaced from the depressed chains will rub against sidewalls of the tires. Therefore, these chains engage the sidewalls and have a scraping effect and help to clean caked on mud and other debris from the sidewalls of the tires. Moreover, it can be appreciated that the combination of a module (108) with a module (208) provides different cleaning actions on the tires of a vehicle and can achieve improved tire cleaning.

Referring now to FIGS. 15-18, there is shown a further embodiment of a tire-cleaning module, generally designated (308). The tire-cleaning module (308) is similar to the tire cleaning module (208) with chains (310) extending longitudinally along the direction of travel along the module (308). The module (308) also includes side frame elements (322) and cross members (326). The chains (310) also wrap around and cylindrical cross members (328). However, instead of being attached at the ends, the chains (310) are continuous and form a loop that extends around the cross members (326) and the end cylindrical members (328). Therefore, the chains (310) will rotate around the loop formed over and around the cross-members (326) and the end members (328), as shown most clearly in FIG. 18.

As with module (208), the module (308) has the chains (310) extending longitudinally. Those longitudinal chains (310) over which a tire passes will deflect downward as the vehicle passes over the chains (310). Moreover, as with module (208), the chains (310) that are not directly beneath the vehicle tires will scrape against the sides of the tires and provide cleaning to sidewalls. However, it can also be appreciated that as the vehicles traverse the module (308), the chains (310) are allowed to rotate around the end cylinders (328) to some degree. The rotating chains (310) are self-cleaning to some degree may help to keep the chains from building up further mud and debris to improve effectiveness.

Figure 19:
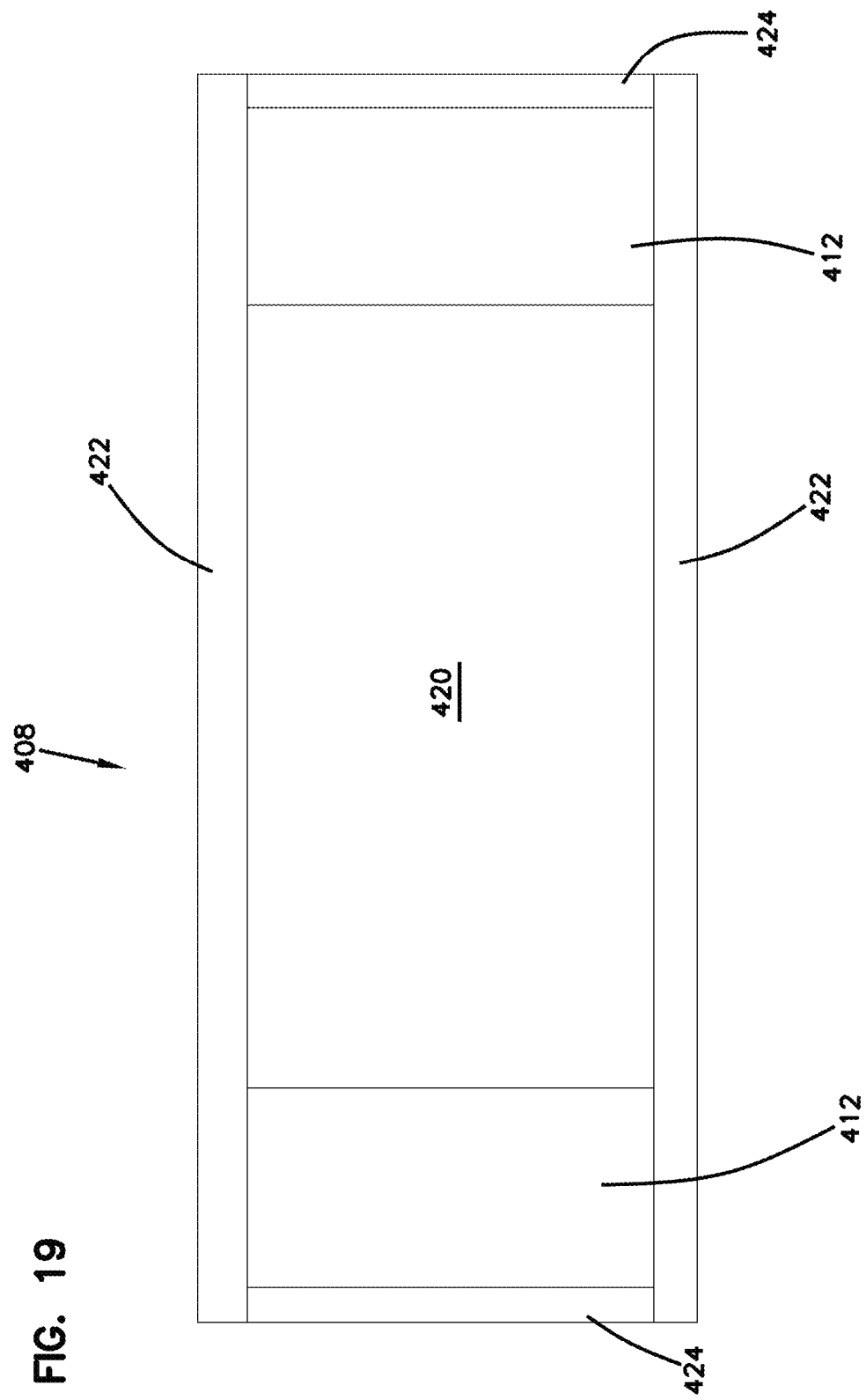
FIG. 19 is a top plan elevational view of a fourth embodiment of a track segment for the vehicle tire cleaning system shown in FIG. 1.

Referring now to FIG. 19, there is shown a fourth embodiment of a track unit for a vehicle tire cleaning system, generally designated (408). The track-cleaning unit (408) may be joined to a similar parallel track unit and form a module with a similar layout as module (102). The track unit includes a framework with sides (422), a bottom (420) and ends (424). Ramps may be added as with other track units to aid in driving onto and off the track unit (408). The track-cleaning unit (408) is generally configured as a pan formed by the bottom (420), sides (422) and ends (424) and includes water to help with washing the tires of vehicles passing through the trough formed by the unit (408). The track unit (408) includes inner ramp portions (412) to aid in driving over the ends (424).

Figure 20:
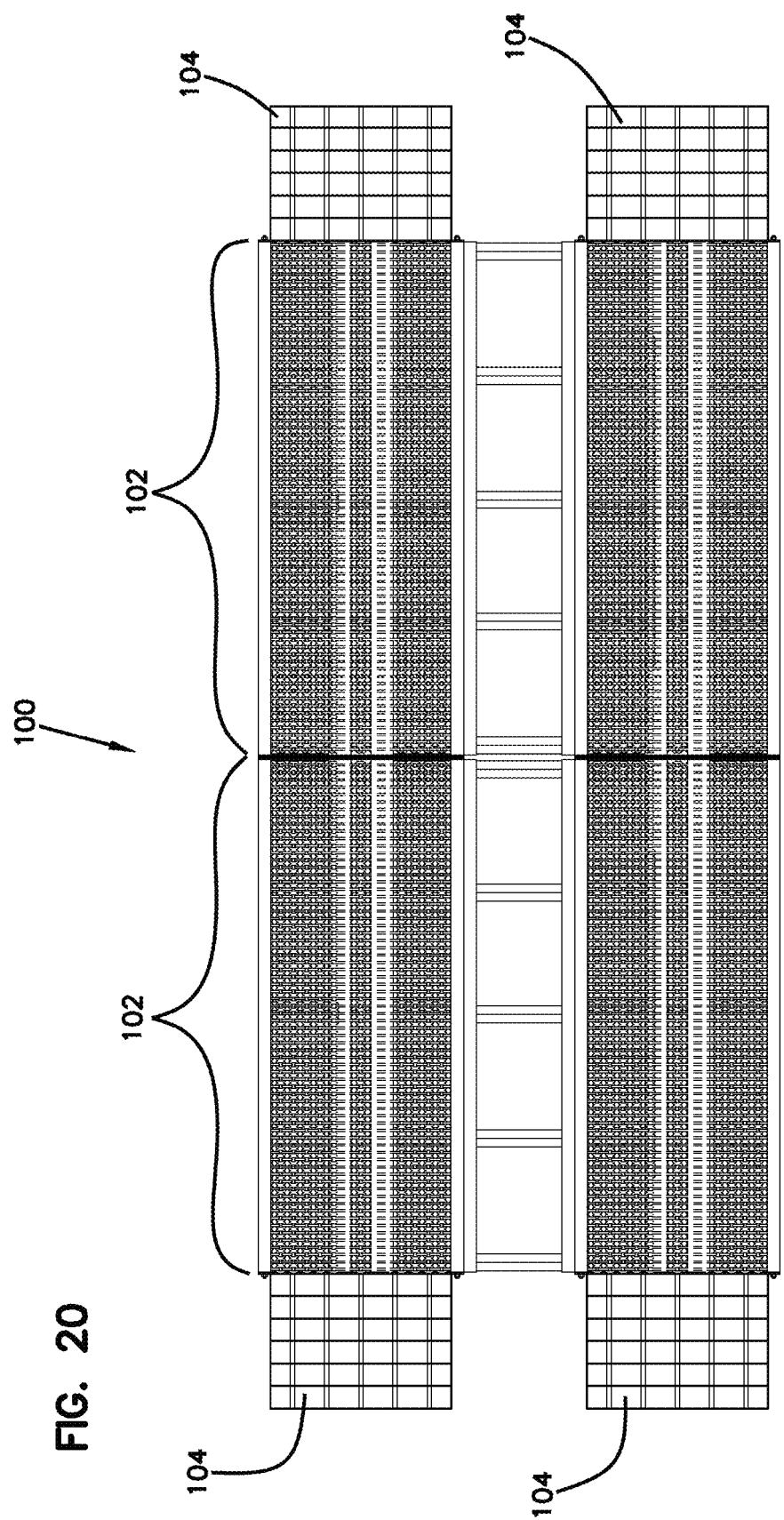
FIG. 20 is a top plan view of the vehicle tire cleaning system shown in FIG. 1 with two modules joined in an end-to-end configuration.
Figure 21:
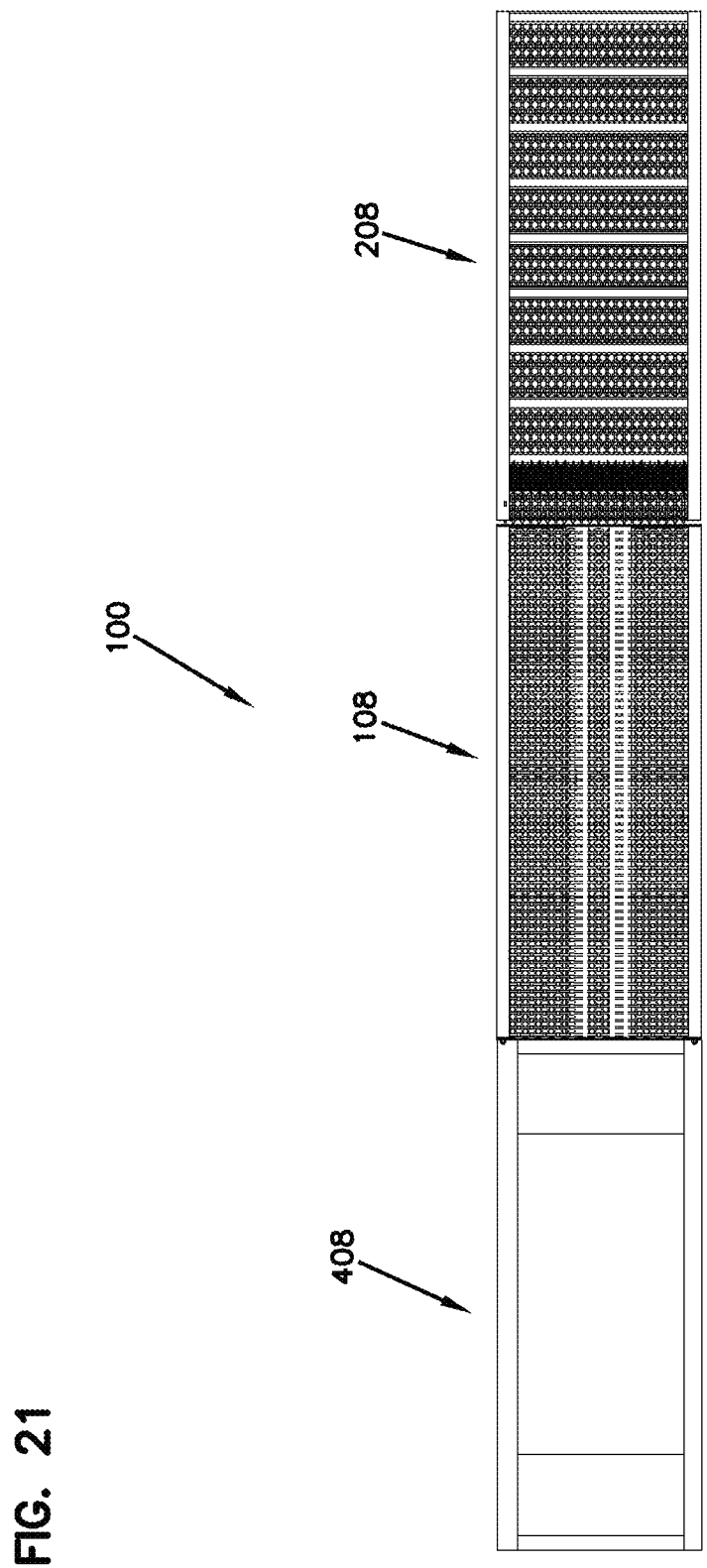
FIG. 21 is a top plan view of the vehicle tire cleaning system shown in FIG. 1 with a module having the track segment shown in FIG. 1 joined in an end to end with a module having the track segment shown in FIG. 11 and a module having a water bath.

Referring now to FIG. 20, it can be appreciated that the cleaning modules (102) may be joined together to form an extended tire cleaning system (100). In addition, as shown in FIG. 21, different types of modules including track units (108), (208), (308) and/or (408) may be joined together to form an extended tire cleaning system with various mixing and matching of chain configurations and/or a trough to clean the tires as vehicles traverse the system (100).

Figure 22:
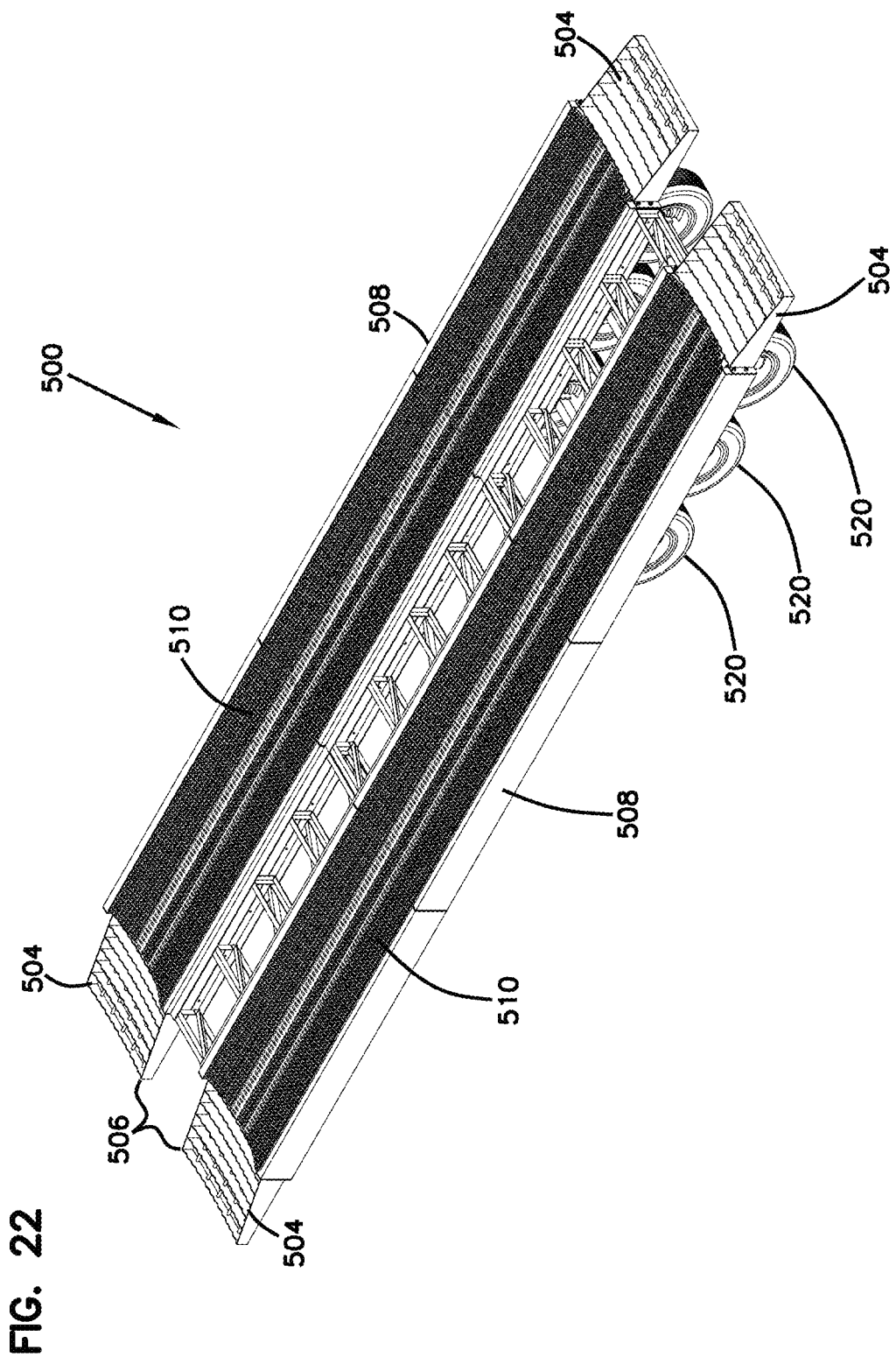
FIG. 22 is a perspective view of a vehicle tire cleaning system configured as a portable trailer according to the principles of the present invention.
Figure 23:
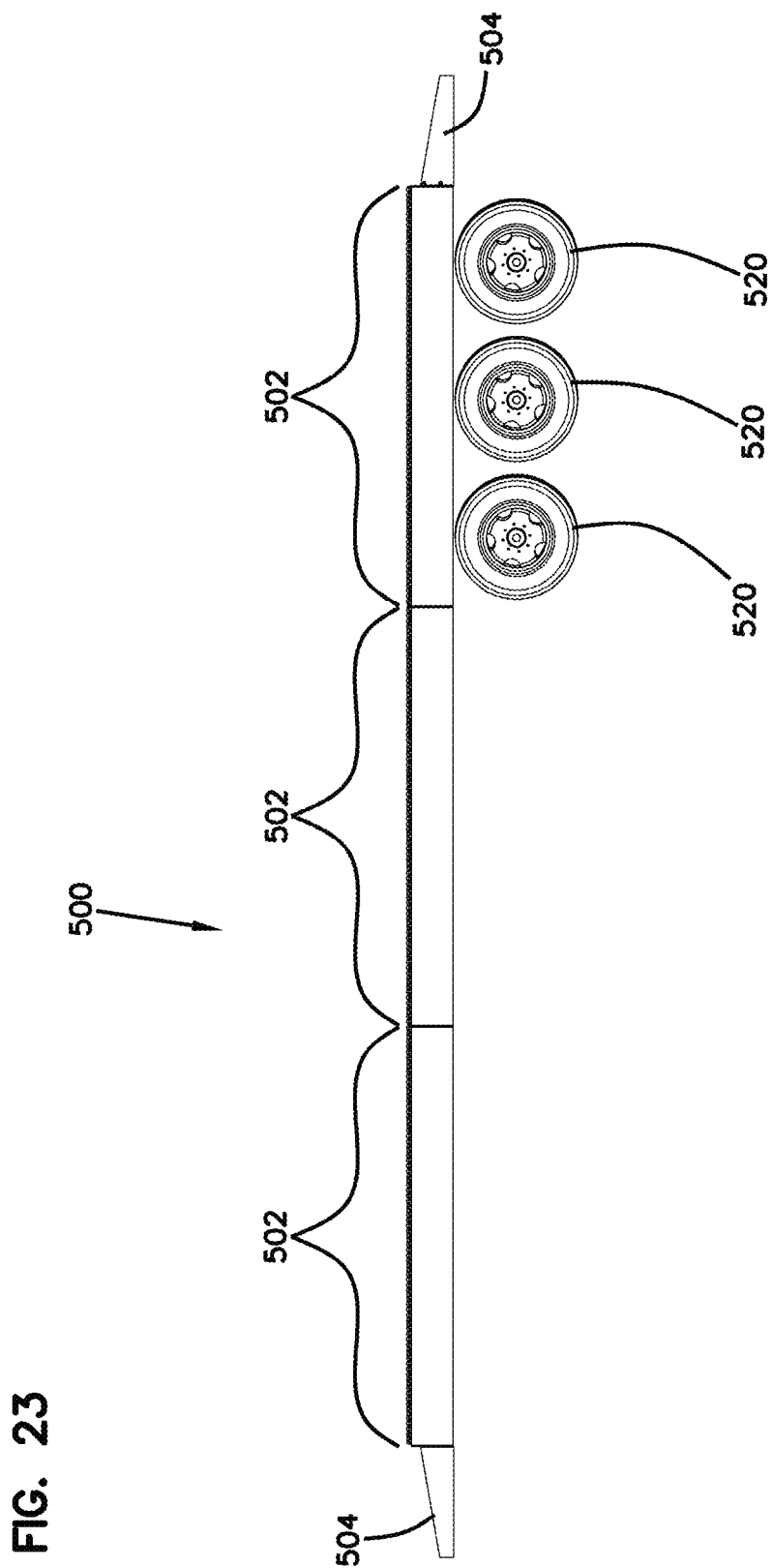
FIG. 23 is a side elevational view of the tire cleaning system shown in FIG. 22.
Figure 24:
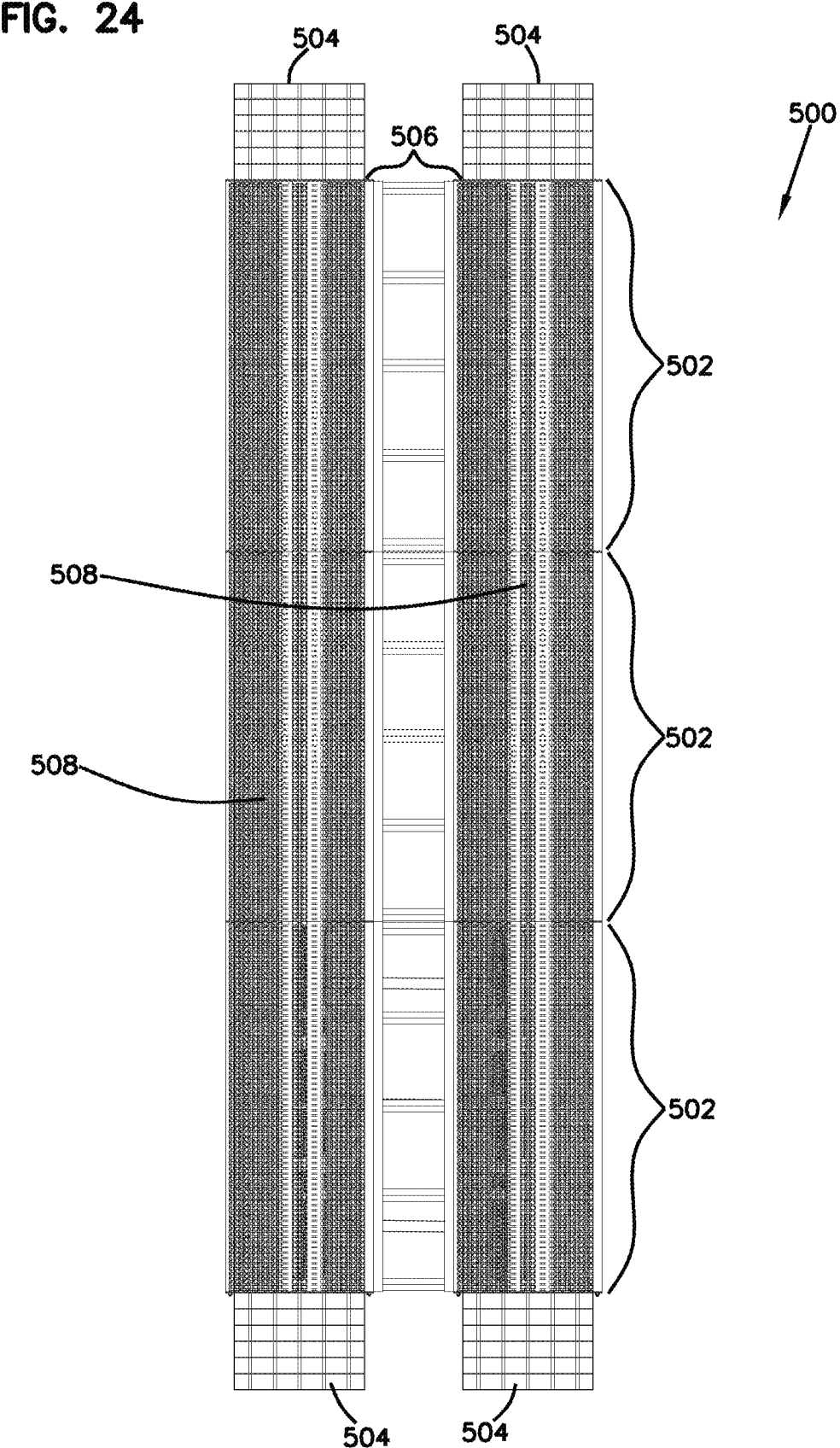
FIG. 24 is a top plan view of the tire cleaning system shown in FIG. 22.
Figure 25:
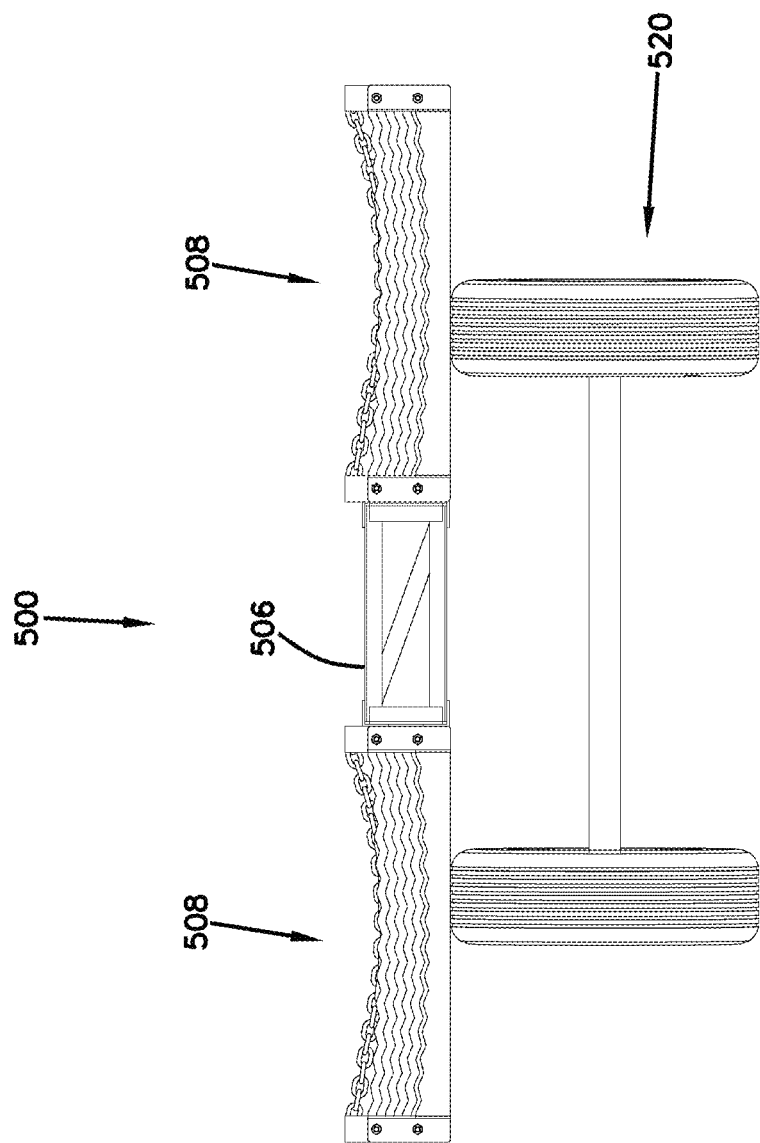
FIG. 25 is an end elevational view of the tire cleaning system shown in FIG. 22.
Figure 26:
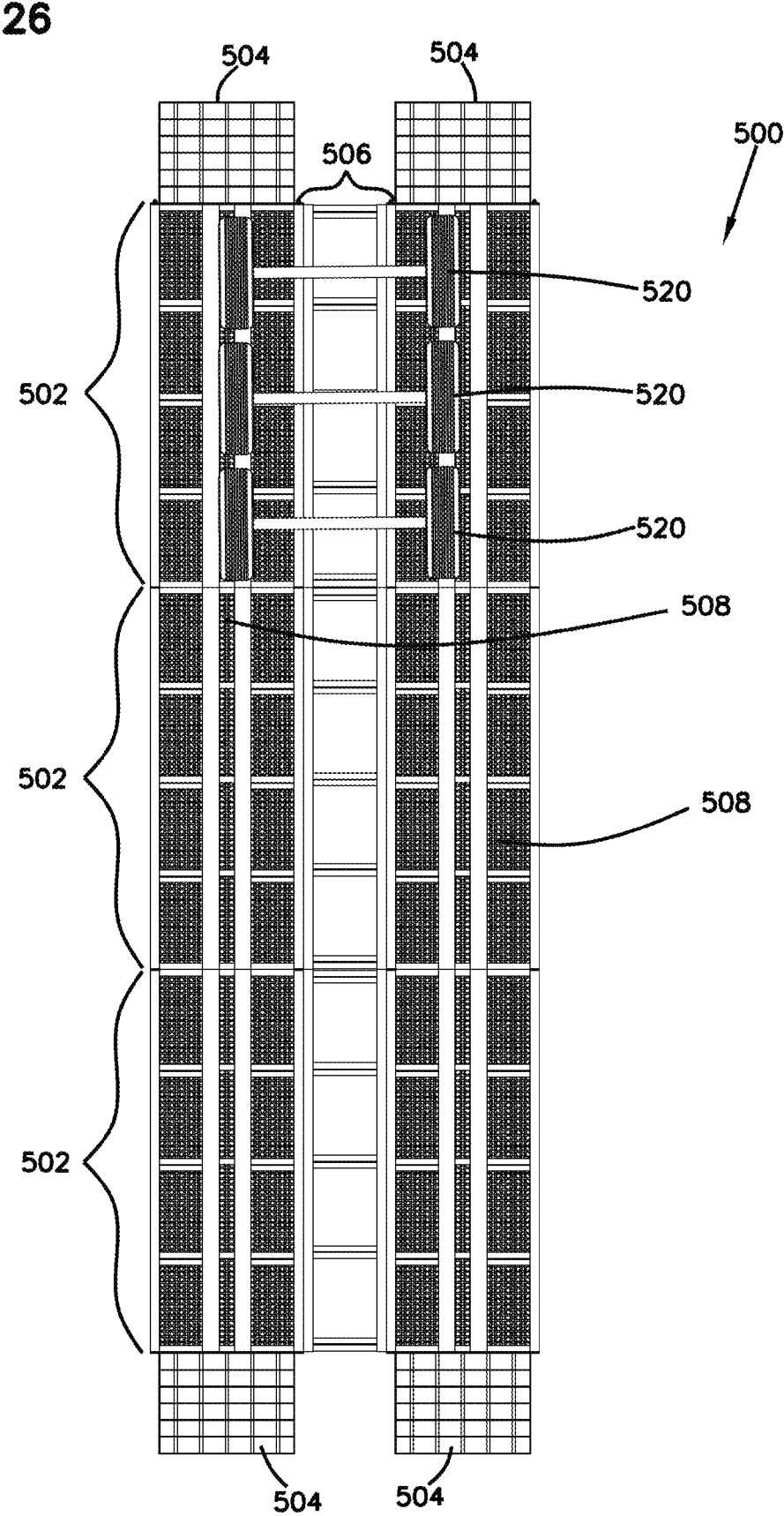
FIG. 26 is a bottom plan view of the tire cleaning system shown in FIG. 22.
Figure 27:
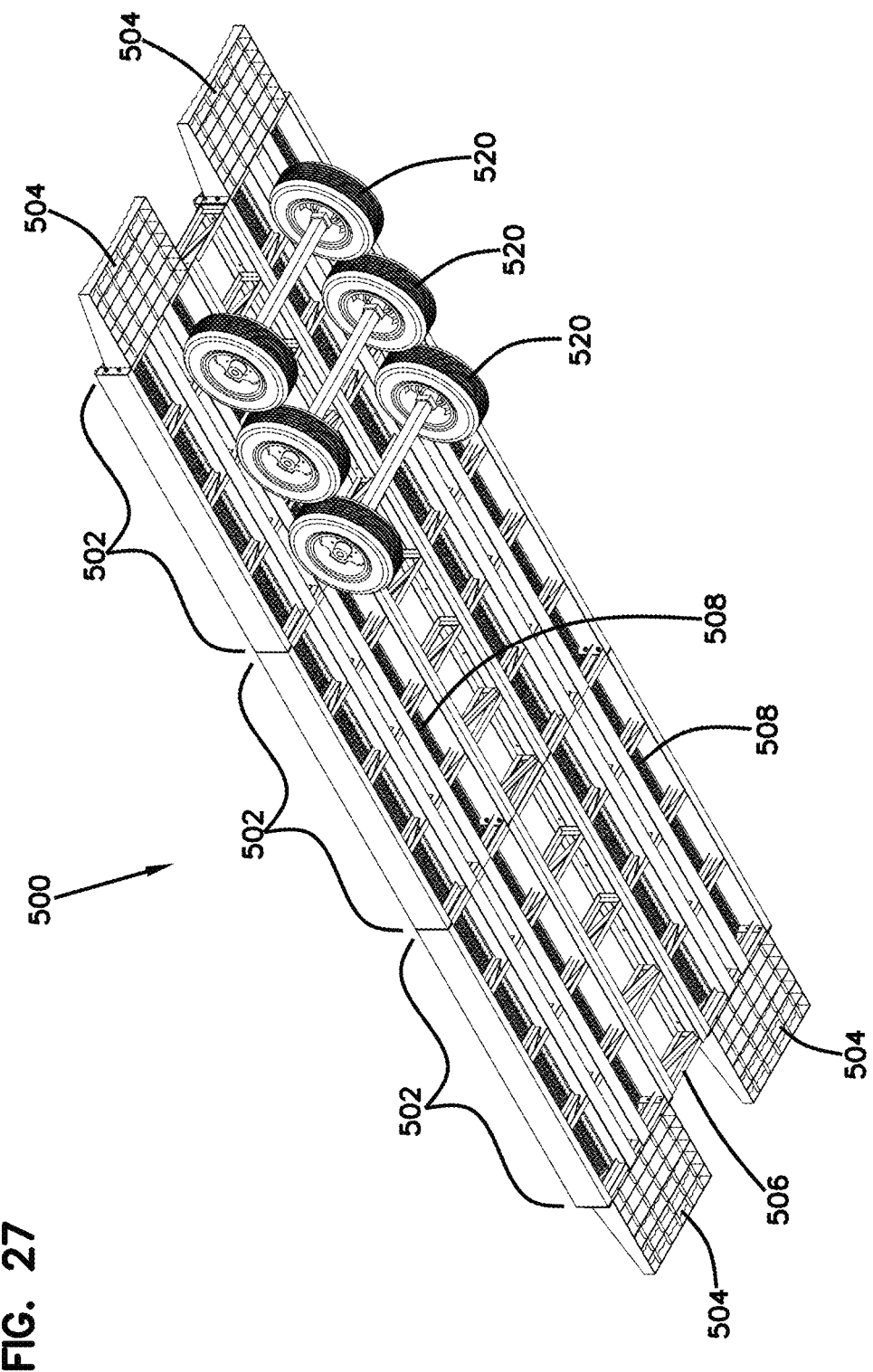
FIG. 27 is a bottom perspective view of the tire cleaning system shown in FIG. 22.
Figure 28:
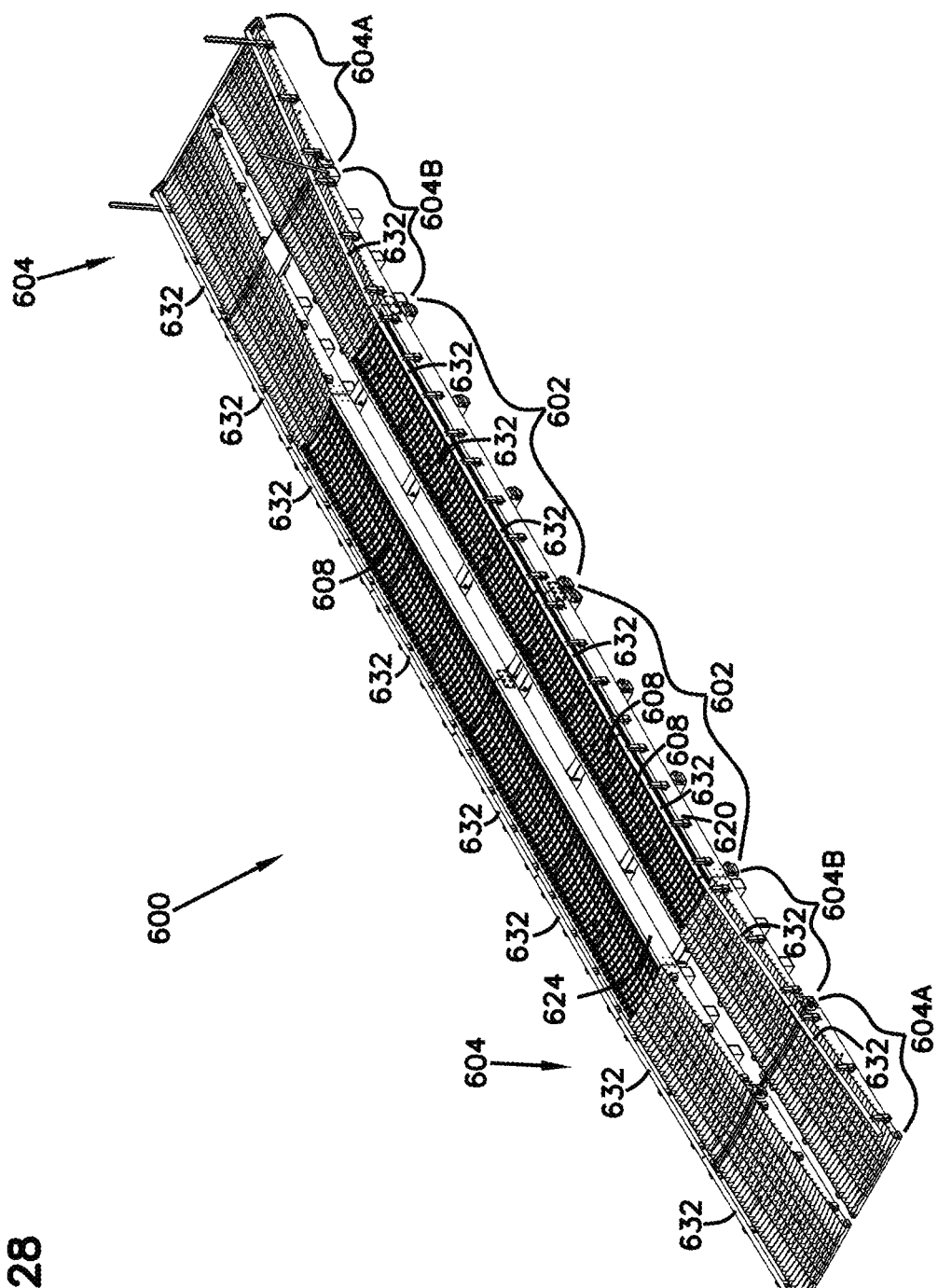
FIG. 28 is a perspective view of a further embodiment of a vehicle tire cleaning system according to the principles of the present invention.
Figure 29:
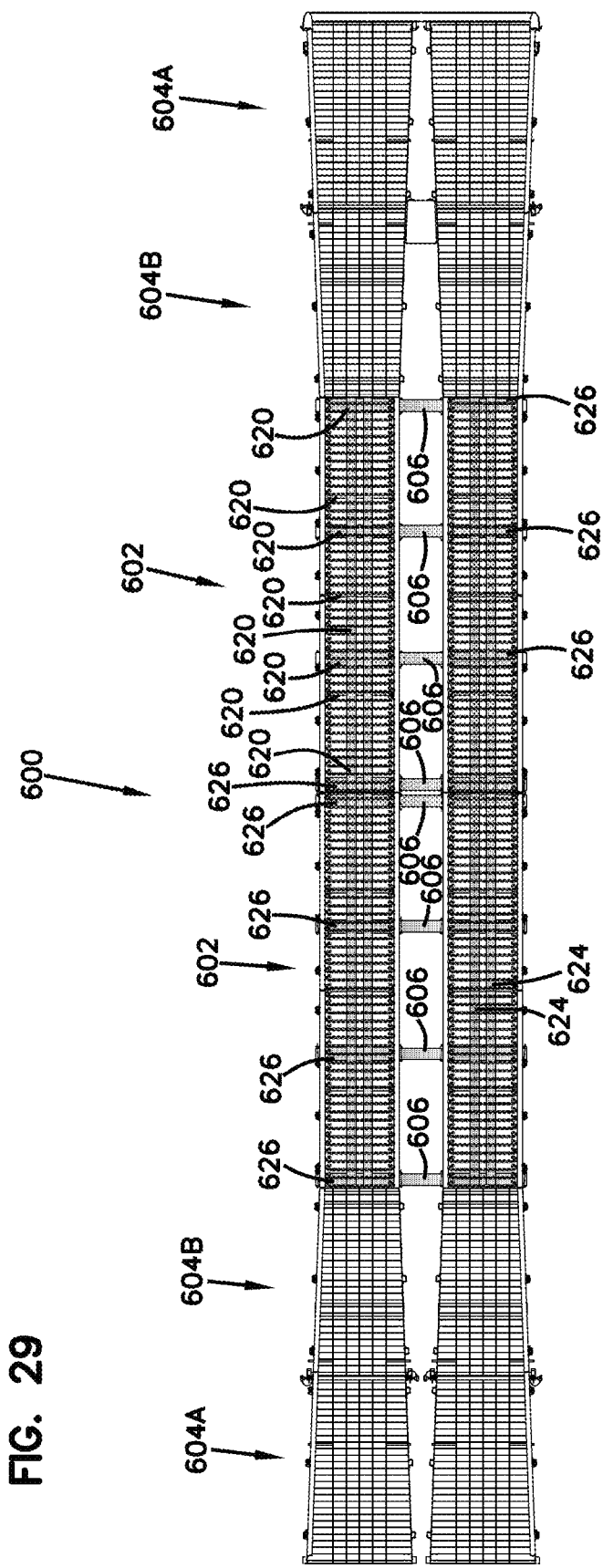
FIG. 29 is a top plan view of the tire cleaning system shown in FIG. 28.

Referring now to FIG. 22, there is shown a tire cleaning system (500) using chain technology and configured for use as a portable trailer. The system (500) includes an elongated pair of tracks (508) joining the center frame (506). Each of the tracks (508) includes ramps (504). The track units (508) include chains (510) that may extend laterally or longitudinally such as with track units (108), (208) and (308). Moreover, it is possible that trough type units (408) could also be interchanged with one of the modular portions for the trailer system (500). Wheel and axle assemblies (520) provide for transport to various locations. The tire and axle assemblies (520) may be removably mounted for placing the system (500) directly on the ground after transport to the use site. It can be appreciated that although the three modules (502) are shown connected to form the trailer type tire cleaning system (500), a trailer could also be formed of fewer or more modules configured as a trailer unit. A towing portion is mountable at the end opposite the tire, axle and wheel assemblies (520).

Referring now to FIGS. 28-31, there is shown a further embodiment of a tire cleaning system, generally designated (600). The tire cleaning system (600) includes cleaning modules (602) with ramps (604) at either end. The module (602) defines tracks (612) on which the vehicles may drive to clean the tires. Multiple modules (602) have been joined together to form an extended tire cleaning system (600). It can be appreciated that for some sites and applications, a longer tire cleaning system made be required to clean material that is more difficult to remove. Moreover, different types of tire cleaning modules may be joined together, mixed and matched for different types of action on the vehicle tires. In the embodiment shown in FIGS. 28-31, the entrance and exit ramps (604) include two ramp modules (604A) and (604B). Such extended length may be preferable at some sites and for some applications to provide additional length and increase the number of chains that a vehicle passes over and to provide a more gradual entrance and exit.

Figure 33:
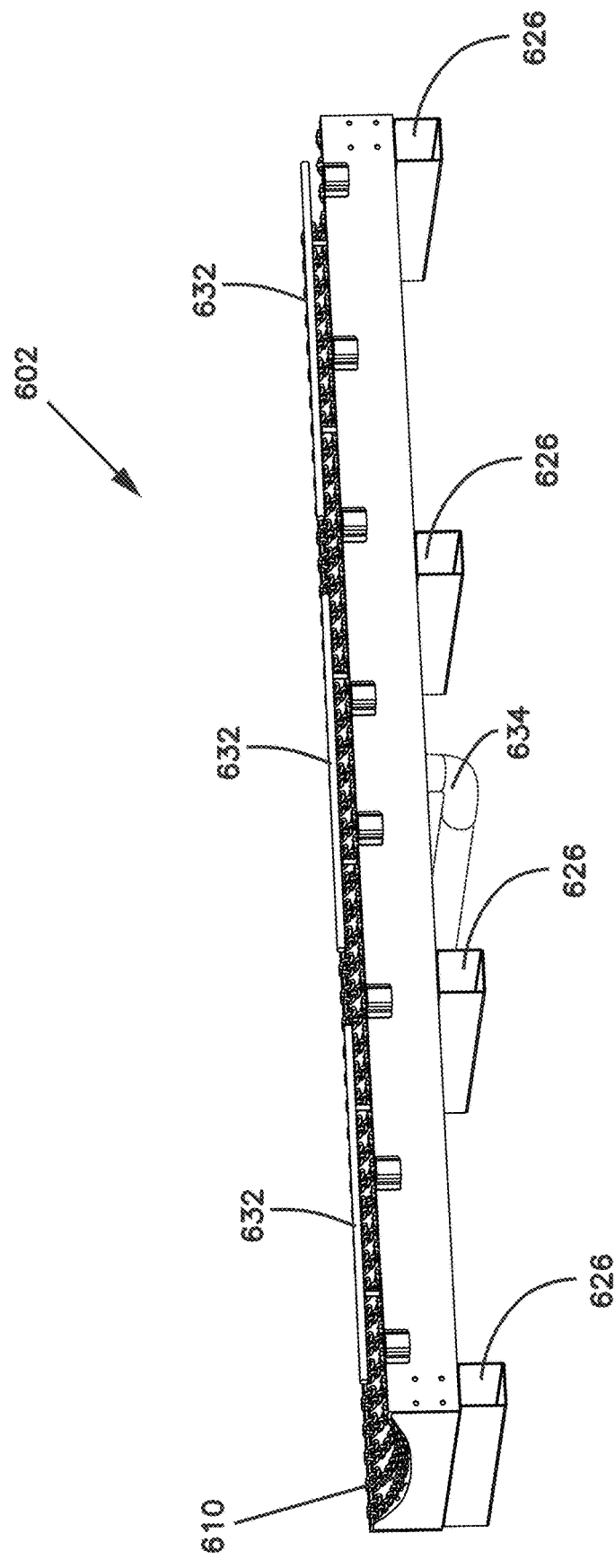
FIG. 33 is a second perspective view of the track unit shown in FIG. 32.
Figure 34:
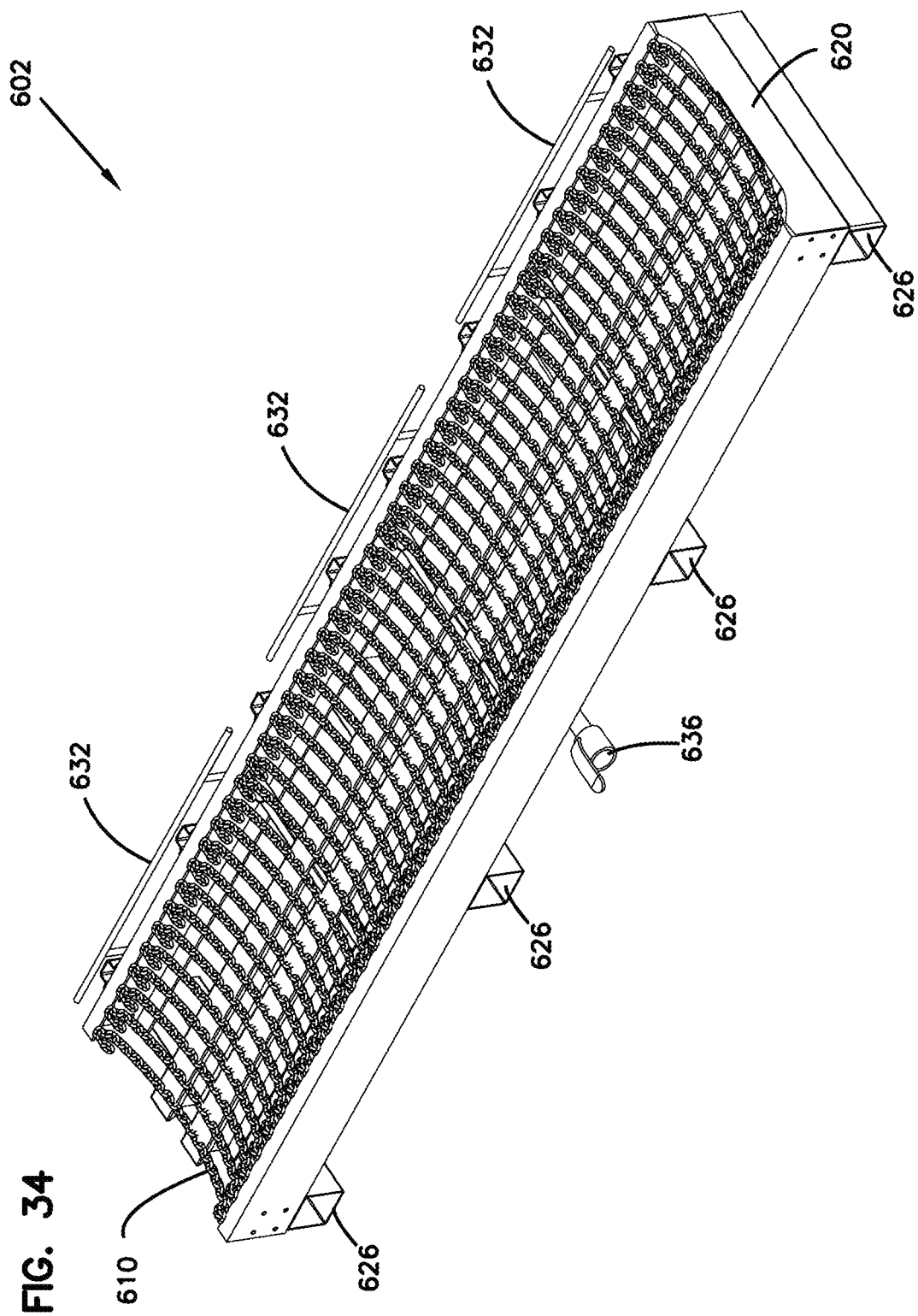
FIG. 34 is a top perspective view of the track unit shown in FIG. 32.
Figure 35:
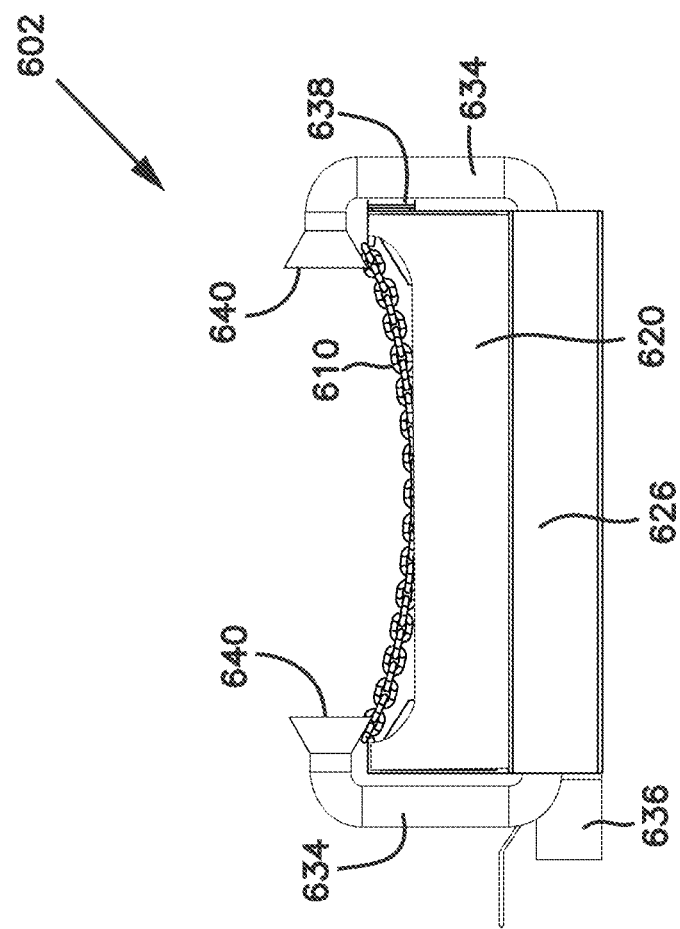
FIG. 35 is an end elevational view of the track unit shown in FIG. 32.
Figure 36:
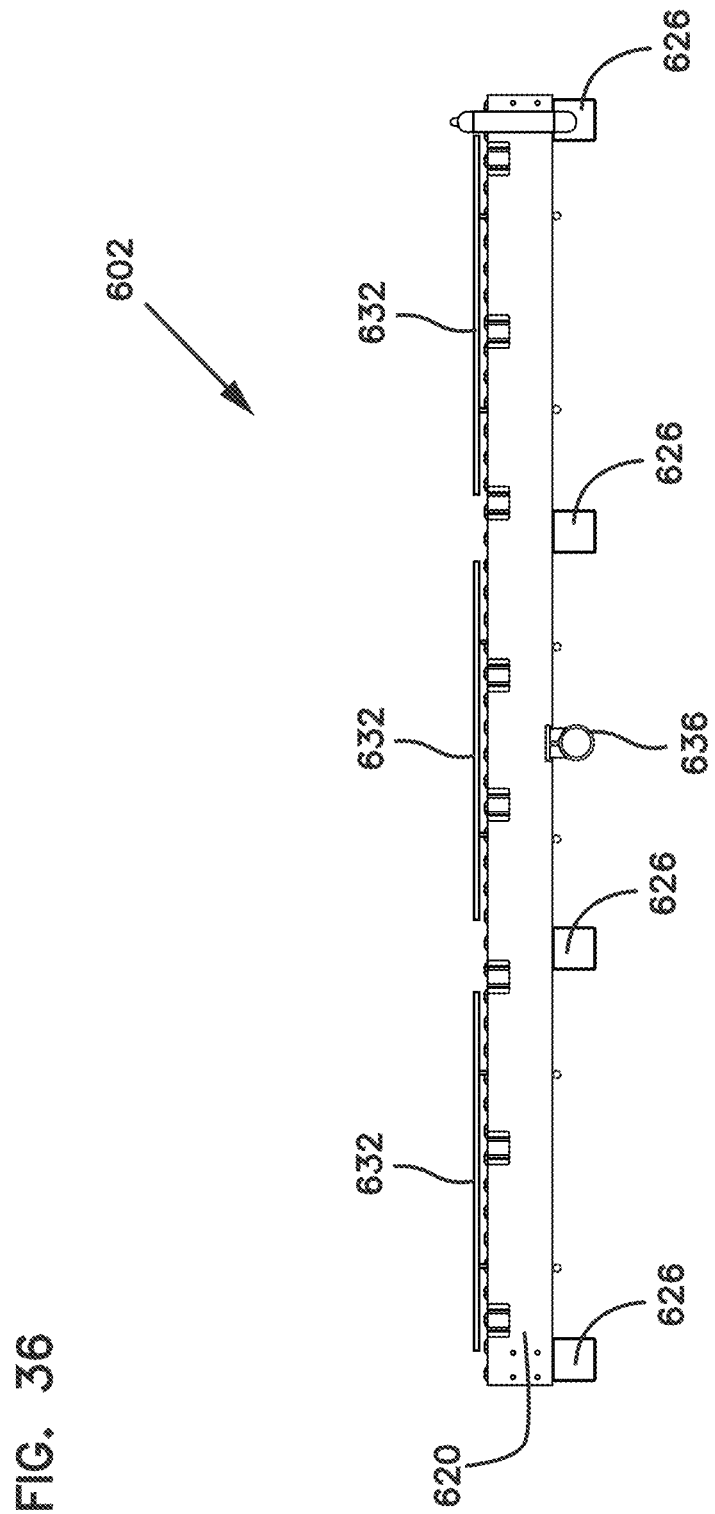
FIG. 36 is a side elevational view of the track unit shown in FIG. 32.

Each of the modules (602) generally includes two track units (608) that are connected by an intermediate or center frame (606). The track units (608) form the spaced apart parallel tracks (612). Each of the track units (608) includes a frame (620) that supports chains (610). In the embodiment shown, the chains (610) extend transversely to a direction of travel, and are mounted similar to the chains of FIGS. 11-18. However, the chains may be arranged as in any of the other embodiments. As shown in FIG. 33, the track units (608) of the module (602) includes a frame (620) with side elements (622) and I-beams (624). Cross members (626) connect the longitudinally extending members (620, 624). Moreover, it can be appreciated that the track unit frame (620) raises the chains (610) upon which vehicles travel and provides sufficient volume below the chains for dirt, mud and other debris that is removed from the tires to fall into without clogging the chains (610) and adversely affecting cleaning effectiveness. Moreover, the volume below the chains allows for accumulation of debris and intermittent removal rather than constant maintenance. It is also appreciated that the cross member (626) are open and can accommodate tines from forklifts. Therefore, the modules (602) or track segments (608) can be easily lifted and transported.

Figure 30:
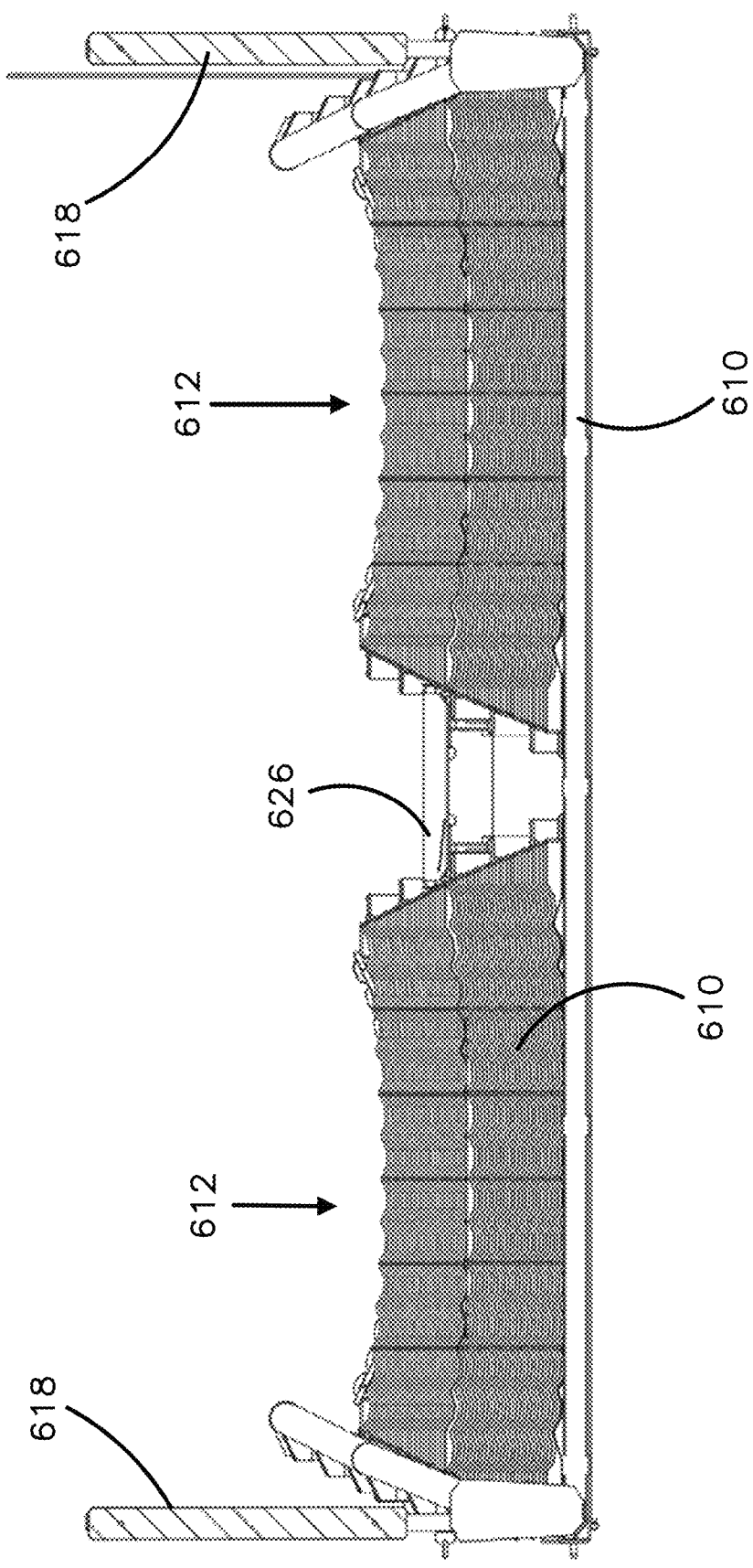
FIG. 30 is an end elevational view of the tire cleaning system shown in FIG. 28.
Figure 31:
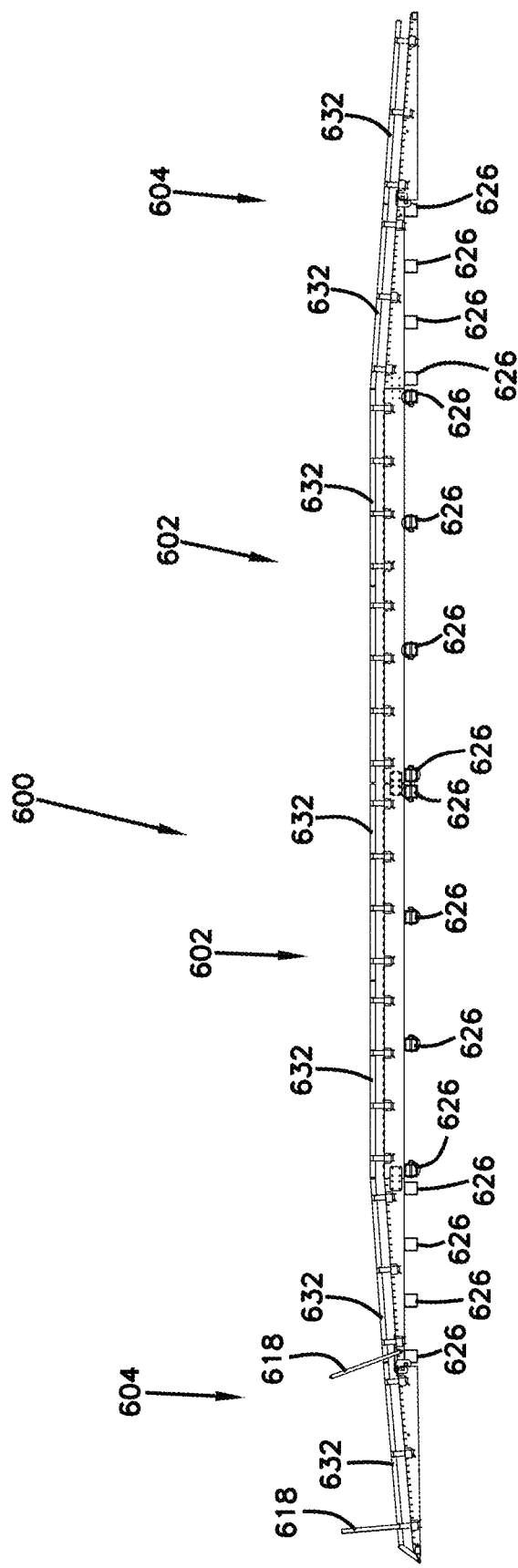
FIG. 31 is a side elevational view of the tire cleaning system shown in FIG. 28.
Figure 32:
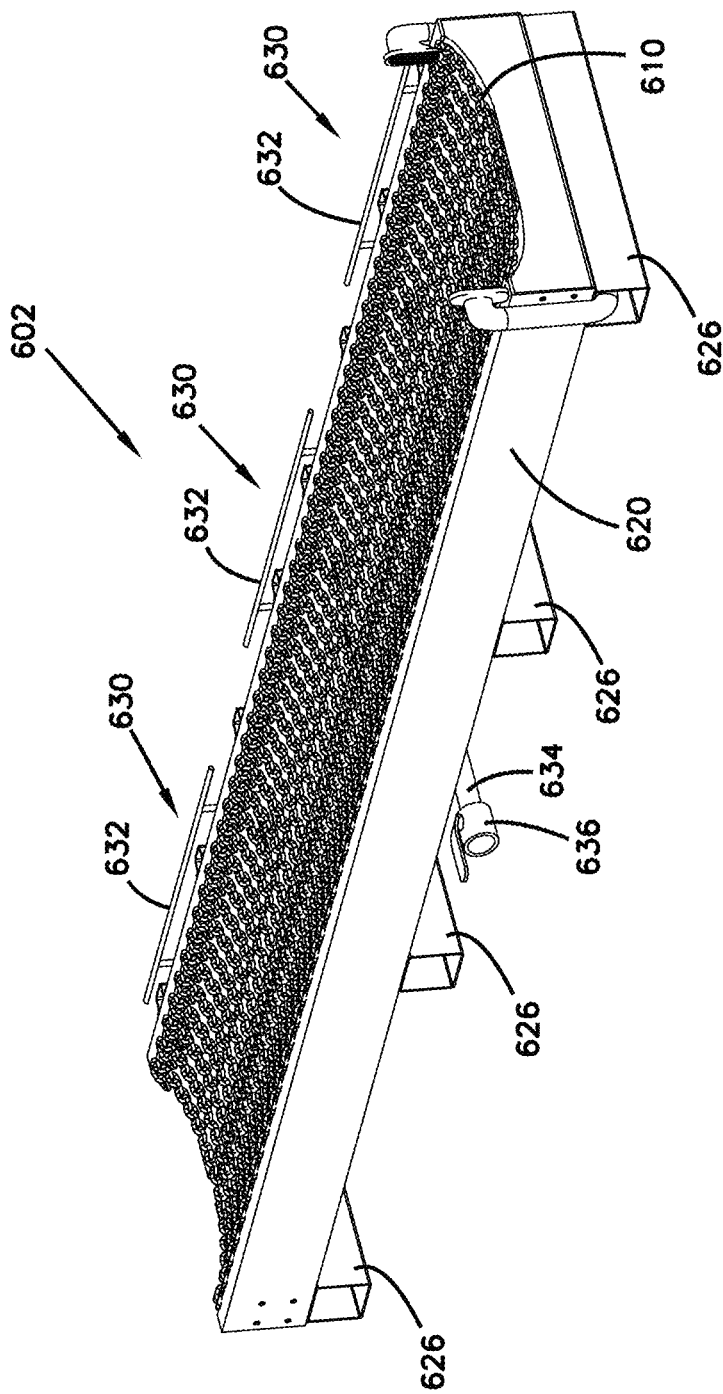
FIG. 32 is a perspective view of a second embodiment of a track unit for the vehicle tire cleaning system shown in FIG. 28.

Guides (618), such as upward extending rods or poles, are mounted on the outer edges of the tire cleaning system (600), as shown most clearly in FIG. 30. The guides (618) help drivers align the vehicles so the tires pass onto the chains (610) when entering the tire cleaning system (600). As the chains (610) are supported to sag between the supports, the chains are somewhat self-centering to aid in maintain vehicles in the correct position while driving over the tire cleaning system (600).

The tire cleaning system (600) is equipped with a water spraying system (630). The clean system includes spray bar (632 extending along the sides of the track units (608). The spray bars (632) include nozzles (640) to deliver water to the sides of tires as vehicles pass over the tire cleaning system (600). Water lines (634) and control valves (636) control the supply of water to the spray bars (632). Sensors (638) may turn water flow on and off to conserve water so that it is only sprayed as a vehicle passes the spray bars (632).

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A system for cleaning tires of a vehicle traveling along a longitudinal direction over the system, the system being configured to be placed over a substrate, the system comprising:
    a plurality of first sets of supports spaced along the longitudinal direction;
    a plurality of second sets of supports spaced along the longitudinal direction; the second sets of supports being spaced laterally apart from the first sets of supports;
    a first chain assembly comprising first chains supported between each of the first sets of supports and maintained in a raised position over the substrate and extending substantially transverse to the longitudinal direction with a center portion of the first chains being below supported ends of the first chains, the first chain assembly defining a first tire track between the supports of each of the first sets of supports, wherein a volume below the first chain assembly is open to the ground; and
    a second chain assembly comprising second chains supported between each of the second sets of supports and maintained in a raised position over the substrate and extending substantially transverse to the longitudinal direction with a center portion of the second chains being below supported ends of the second chains, the second chain assembly defining a second tire track between the supports of each of the second sets of supports, wherein a volume below the second chain assembly is open to the ground.

2. A system for cleaning tires of a vehicle according to claim 1, wherein each of the supports retains a respective chain assembly with a length of chain being raised and spaced apart from the substrate.

3. A system for cleaning tires of a vehicle according to claim 1, further comprising a guardrail at each side of the system.

4. A system for cleaning tires of a vehicle according to claim 1, further comprising a pair of entrance ramps, each entrance ramp being aligned with one of the tire tracks.

5. A system for cleaning tires of a vehicle according to claim 4, further comprising a pair of exit ramps, each exit ramp being aligned with one of the tire tracks.

6. A system for cleaning tires of a vehicle according to claim 4, further comprising alignment guides extending upward from sides of the entrance ramps.

7. A system for cleaning tires of a vehicle according to claim 1, further comprising a pair of entrance ramps, each entrance ramp being aligned with one of the tire channels and each entrance ramp comprising two aligned segments.

8. A system for cleaning tires of a vehicle according to claim 1, wherein the first chain assembly comprises a first chain and the second chain assembly comprises a second chain.

9. A system for cleaning tires of a vehicle according to claim 1, wherein the supports are adjustable.

10. A system for cleaning tires of a vehicle according to claim 1, wherein the first chain assembly comprises a plurality of first chains and the second chain assembly comprises a plurality of second chains.

11. A system for cleaning tires of a vehicle according to claim 10, wherein the first chains and the second chains are rotatably mounted to the supports.

12. A system for cleaning tires of a vehicle according to claim 1, comprising a plurality of beams extending along the longitudinal direction.

13. A system for cleaning tires according to claim 12, further comprising cross beams supporting and raising the plurality of beams extending along the longitudinal direction.

14. A system for cleaning tires of a vehicle according to claim 12, wherein the first and seconds supports are spaced to allow a set of dual wheels of a vehicle to pass over the chains between the supports and to self-align.

15. A system for cleaning tires of a vehicle according to claim 1, further comprising sprayers at sides of the system.

16. A system for cleaning tires of a vehicle according to claim 1, wherein the chain assemblies are supported to deflect and to engage a tread of the tire and portions of sides of the tire traveling on the chain assemblies.

17. A system for cleaning tires of a vehicle according to claim 1, wherein the chain assemblies are supported with a center portion between the supports being lower than portions of the chain assemblies proximate the supports.

18. A method of cleaning tires of a vehicle with a tire cleaning system, the tire cleaning system comprising a first bed of a plurality of transversely extending chains supported in a raised position over a substrate defining a first lane of travel along the longitudinal direction, and a second bed of a plurality of transversely extending chains supported in a raised position over a substrate defining a second lane of travel along the longitudinal direction, the first bed of a plurality of transversely extending chains comprising a center portion below supported ends of the first bed of a plurality of transversely extending chains, the second bed of a plurality of transversely extending chains comprising a center portion below supported ends of the second bed of a plurality of transversely extending chains, wherein a volume below the first bed and a volume below the second bed are open to the ground, the first lane of travel being spaced laterally from the second lane of travel, the method comprising:

aligning left tires of a vehicle with the first lane of travel and aligning right tires of the vehicle with the second lane of travel;

driving the vehicle over the tire cleaning system with the left tires passing along the first lane of travel and engaging and deflecting the transversely extending chains to follow a periphery of the left tires, and with the right tires passing along the second lane of travel and engaging the transversely extending chains to follow a periphery of the right tires.

19. The method according to claim 18, further comprising spraying water at the tires while passing over the tire cleaning system.

20. The method of cleaning tires of a vehicle with a tire cleaning system of claim 18, further comprising a step of cleaning the tire cleaning system by lifting the tire cleaning system and removing debris cleaned from tires from beneath the tire cleaning system.

21. A system for cleaning tires of a vehicle traveling along a longitudinal direction over the system, the system being positioned over a substrate, the system comprising:

debris removal elements supported to be a first tire track supported between a first set of supports raised over the substrate and extending substantially transverse to the longitudinal direction, and a second tire track supported between a second set of supports raised over the substrate and extending substantially transverse to the longitudinal direction, the first tire track and the second tire track aligning with tires of a vehicle;

the first tire track comprising a first chain assembly supported in a raised position between the first set of supports and space apart from the substrate and extending substantially transverse to the longitudinal direction, and a second chain assembly supported in a raised position between the second set of supports and spaced apart from the substrate and extending substantially transverse to the longitudinal direction;

the first chain assembly and the second chain assembly creating voids for debris to pass through to an open volume extending to the ground below the first chain assembly and the second chain assembly, wherein the first chain assembly comprises a center portion below supported ends of the first chain assembly, wherein the second chain assembly comprises a center portion below supported ends of the second chain assembly.

* * * * *